US008319853B2

(12) United States Patent
Fukuda

(10) Patent No.: US 8,319,853 B2
(45) Date of Patent: Nov. 27, 2012

(54) IMAGE PROCESSING APPARATUS, IMAGE PROCESSING METHOD, AND COMPUTER PROGRAM

(75) Inventor: Yasuo Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 12/752,993

(22) Filed: Apr. 1, 2010

(65) Prior Publication Data

US 2010/0253852 A1 Oct. 7, 2010

(30) Foreign Application Priority Data

Apr. 7, 2009 (JP) ................................ 2009-093350

(51) Int. Cl.
*H04N 5/228* (2006.01)
*H04N 5/217* (2006.01)
*H04N 9/68* (2006.01)
(52) U.S. Cl. .................. 348/222.1; 348/241; 348/234; 348/235; 348/252
(58) Field of Classification Search ............... 348/222.1, 348/241, 234, 235, 252
See application file for complete search history.

(56) References Cited

U.S. PATENT DOCUMENTS

| 5,801,745 | A | * | 9/1998 | Wada et al. ................ 347/232 |
| 6,081,302 | A | * | 6/2000 | Hanai ........................ 348/630 |
| 6,768,514 | B1 | | 7/2004 | Tsuchiya |
| 2005/0089221 | A1 | * | 4/2005 | Shirasawa ................... 382/167 |
| 2009/0059026 | A1 | * | 3/2009 | Katagiri et al. ........... 348/222.1 |

OTHER PUBLICATIONS

Jobson et al ,"A Multiscale Retinex for Bridging the Gap Between Color Images and the Human Observation of Scenes",IEEE Transactions on Image Processing, vol. 6, No. 7, Jul. 1997.
Reinhard et al , "Photographic Tone Reproduction for DigitalImages"acm Transactions on Graphics, vol. 21, No. 3, Jul. 2002.

* cited by examiner

*Primary Examiner* — James Hannett
(74) *Attorney, Agent, or Firm* — Canon USA Inc. IP Division

(57) ABSTRACT

An image processing apparatus includes an extraction unit configured to extract a plurality of luminance low frequency components different in frequency band from a luminance component of image data, and a color adjustment unit configured to execute color adjustment of the image data using the image data or the luminance component of the image data and the plurality of luminance low frequency components, wherein, when an effect of color adjustment based on the luminance low frequency component having a relatively low frequency is larger than an effect of color adjustment based on the luminance low frequency component having a relatively high frequency among the plurality of luminance low frequency components, the color adjustment unit reduces the effect of color adjustment based on the luminance low frequency component having the relatively low frequency.

20 Claims, 14 Drawing Sheets

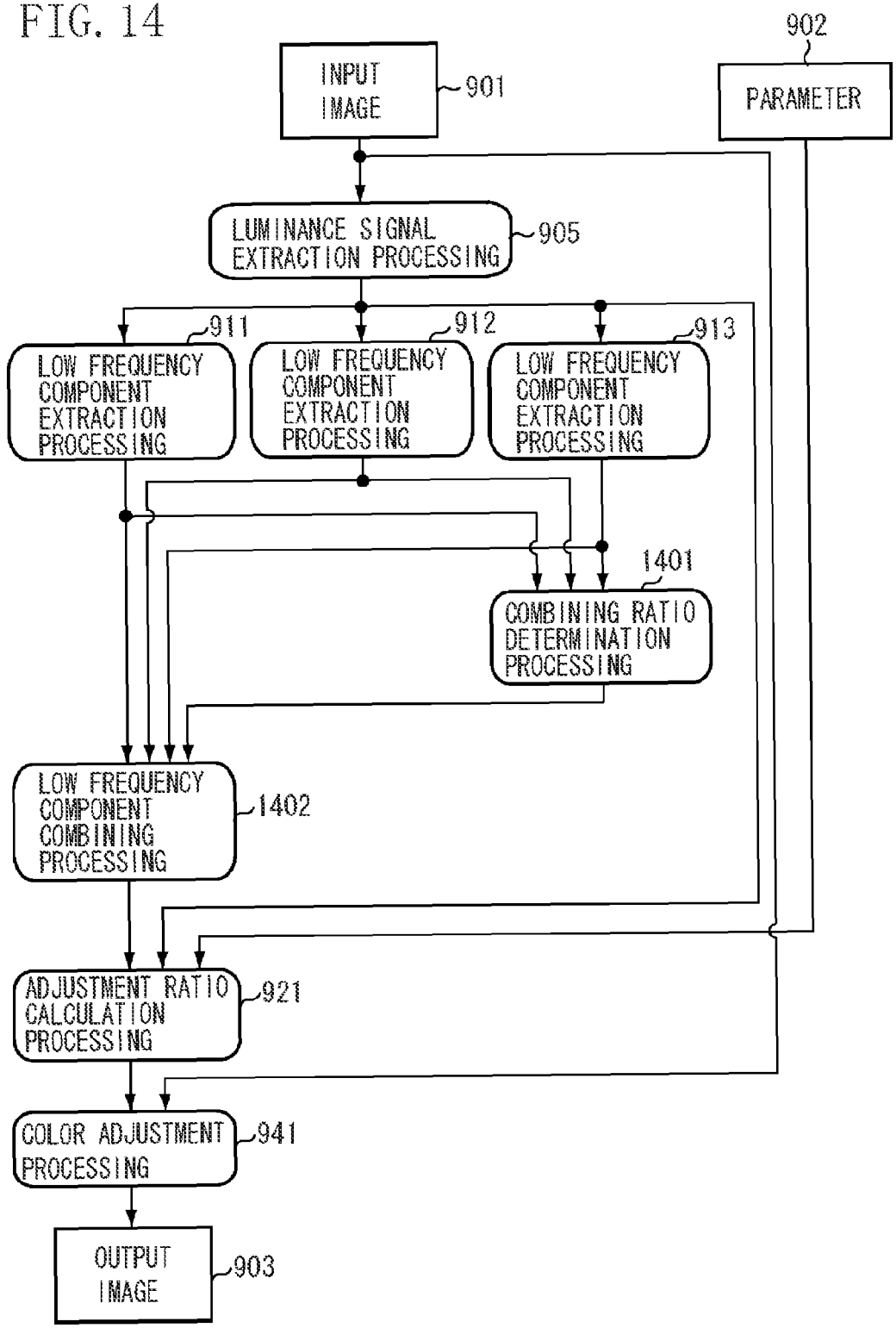

IMAGE PROCESSING APPARATUS, IMAGE PROCESSING METHOD, AND COMPUTER PROGRAM

BACKGROUND OF THE INVENTION

1. Field of the Invention

The present invention relates to an apparatus, method, and computer program which adjust a distribution of brightness of a digital image.

2. Description of the Related Art

As one of methods for capturing a photograph with correct brightness, a method has previously been known which measures average luminance of a scene to be photographed to control a shutter speed, an aperture value, and the like of a camera using the measured result. Further, an exposure control method by the so-called evaluative light metering method has been known which divides a scene into predetermined regions, assigns a weight to the luminance measured for each divided region, and determines average luminance using its result, thereby obtaining correct exposure.

However, in a backlight scene, which is a scene in which the brightness of a main object to be photographed is significantly dark compared with the brightness of a background, in a captured image, the portion of the main object is darkened. In such a backlight scene, in order to capture a photograph with correct brightness, exposure of a camera needed to be set so as to be rather brightly photographed before photographing. However, an operation of such an exposure correction not only is burdensome but also requires skill to correctly perform a setting of the camera. Further, when an exposure correction has correctly been performed on the main object, the background portion may be made too bright.

Also in a scene such as the backlight scene or the like which is difficult to correctly determine the brightness of an image, it is required to obtain an image with correct brightness. In analog photography, a dodging process can be performed, thereby allowing a print with correct brightness to be obtained. The dodging process in the analog photography performs normal exposure in a section of an intermediate density, reduces the amount of exposure in a bright section in which the image has high luminance and is likely to be saturated, and increases the amount of exposure in a dark section in which the image is likely to be crushed. Also in digital image processing, it is desirable to realize such a dodging process.

As a method for realizing such the processing, there is, for example, a technique discussed in Jobson., et al., "A Multi-scale Retinex for Bridging the Gap between Color Images and the Human Observation of Scenes", IEEE TRANSACTIONS ON IMAGE PROCESSING, Vol. 6, No. 7, July 1997. This technique performs differential processing between a component obtained by logarithmically converting a digital image and a low frequency component of its logarithmically converted component, thereby performing processing to darken a bright component in a low frequency region of the digital image and brighten a dark component in the low frequency region thereof. Thus, this technique performs processing in this manner, thereby improving the image.

Further, in Reinhard, et al., "Photographic Tone Reproduction for Digital Images", ACM Transactions on Graphics, Vol. 21, No. 3, July 2002, a method is also discussed which uses a luminance component of a digital image and a low frequency component of its digital image, thereby obtaining an effect like a dodging process in digital image processing.

Furthermore, a demand for correction of an image is not limited to a still image but is similar to that in a moving image. The moving image can be regarded as a gathering of a series of still images continued in the time axis direction. Thus, a technique concerning correction of the image as described above can easily be applied to the moving image or the like.

There are various color spaces which defines image data. The color spaces include, for example, red-green-blue (RGB), particularly, standard RGB (sRGB) described in International Electrotechnical Commission (IEC) 61966-2-1, YCbCr obtained by performing linear transformation on RGB (particularly, a color space obtained by performing RGB-YCC transformation on the above-described sRGB is referred to as sYCC), Commission International de l'Éclairage (CIE) 1931XYZ, CIE Luminescence alpha beta (L*a*b*), and the like. In a color space other than RGB among color spaces described above, a scale for representing brightness, in other words, an axis corresponding to luminance is present. Specifically, Y in YCbCr color space, Y in CIE 1931XYZ color space, and L* in CIE L*a*b* color space correspond to an axis corresponding to luminance. Further, the remaining values, in other words, Cb and Cr in YCbCr color space, X and Z in CIE 1931XYZ, and a* and b* in CIE L*a*b* color space, correspond to an axis for representing color. Alternatively, there is also a case in which a value for representing these colors is converted into a local coordinate expression and a distance from the origin is referred to as "saturation".

In order to adjust brightness of an image, image data for correction may be transformed into these color spaces (as needed), thereby operating a value corresponding to luminance in its color space. However, in the above-described image processing method for realizing the digital dodging process, when the image is brightly corrected, the image may excessively brightly be modified on the bright side of the boundary between a bright section and a dark section in the image. When an image of a person in a backlight state is modified, the bright section occurs along the contour of the person and the occurred bright section (overcorrected section) is visible like a nimbus. Thus, this is referred to as a halo (nimbus). When such the halo occurs, in particular, since an originally bright section is further brightened by overcorrection, color saturation may also occur to lose color. Thus, there is a situation that may be recognized as a reduction in image quality.

To meet this situation, Jobson, et al., U.S. Pat. No. 6,768, 514 discusses a method for switching resolution of low frequency component extraction in the vicinity of the edge of an image. However, this method needs edge component extraction processing. Thus, when realizing it by hardware, it is necessary to add a configuration for edge extraction. Further, when configuring it by software, there is an issue that makes processing heavy.

SUMMARY OF THE INVENTION

The present invention is directed to an image processing apparatus capable of obtaining a digital image with correct brightness.

According to an aspect of the present invention, an image processing apparatus includes an extraction unit configured to extract a plurality of luminance low frequency components different in frequency band from a luminance component of image data, and a color adjustment unit configured to execute color adjustment of the image data using the image data or the luminance component of the image data and the plurality of luminance low frequency components, wherein, when an effect of color adjustment based on the luminance low frequency component having a relatively low frequency is larger than an effect of color adjustment based on the luminance low frequency component having a relatively high frequency among the plurality of luminance low frequency components, the color adjustment unit reduces the effect of color adjustment based on the luminance low frequency component having the relatively low frequency.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a block diagram illustrating an example of image processing in an image processing apparatus.

DESCRIPTION OF THE EMBODIMENTS

Various exemplary embodiments, features, and aspects of the invention will be described in detail below with reference to the drawings.

Figure 1:
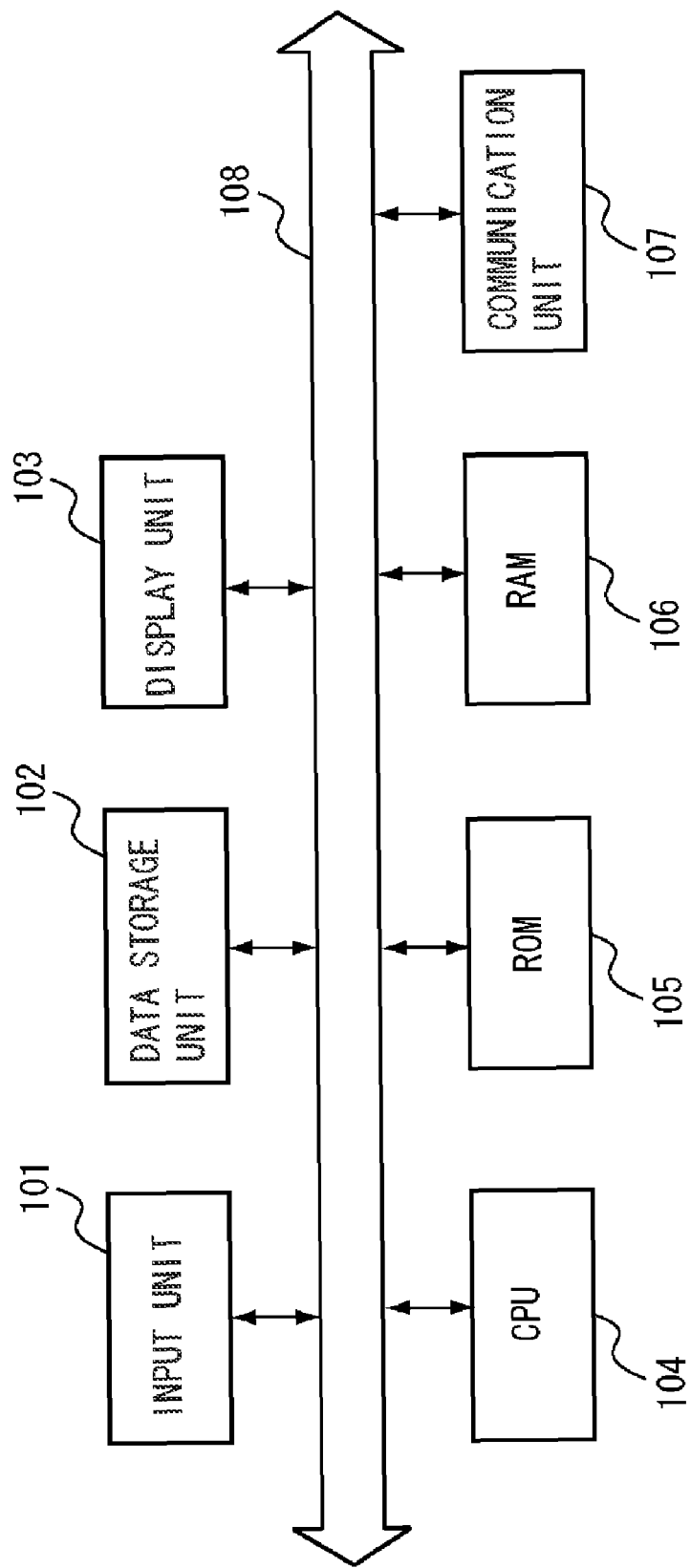
FIG. 1 is a block diagram illustrating an example of the configuration of an image processing apparatus according to an exemplary embodiment of the present invention.

FIG. 1 is a block diagram illustrating an example of the configuration of an image processing apparatus according to a first exemplary embodiment of the present invention. In FIG. 1, an input unit 101 is a device for inputting instructions from a user and data, and includes a keyboard and a pointing device. The pointing device includes a mouse, a track ball, a track pad, a tablet, or the like. When the image processing apparatus in the present exemplary embodiment is applied to, for example, a known digital camera apparatus (imaging apparatus), the input unit is provided by a button, a mode dial, or the like.

A data storage unit 102 stores image data. The data storage unit 102 is configured by, for example, a hard disk, a flexible disk, a compact disc read only memory (CD-ROM), a compact disc-recordable (CD-R) or a digital versatile disc (DVD), a memory card, a CompactFlash (CF) card, smart media, a secure digital (SD) card, a memory stick, an xD picture card, a universal serial bus (USB) memory, or the like. The data storage unit 102 can store, other than image data, a program and other data. Alternatively, when a memory capacity sufficient to store an intermediate image (luminance component image) or the like, which will be described below, can be secured by a random access memory (RAM) 106, the data storage unit 102 may be configured so as to be omitted.

A communication unit 107 is an interface (I/F) for executing communication between devices. The communication unit 107 can be communicated by a communication method using wire such as, for example, known Ethernet, a universal serial bus (USB), Institute of Electrical and Electronics Engineers 1284 (IEEE1284), IEEE1394, and a telephone line. Alternatively, the communication unit 107 may be communicated by a communication method using wireless such as Infrared data Association (IrDA), IEEE802.11a, IEEE802.11b, IEEE802.11g, Bluetooth (registered trademark), and ultra wide band (UWB).

A display unit 103 is a device that displays an image before and after image processing, and displays an image such as a graphical user interface (GUI). As the display unit 103, generally, a cathode ray tube (CRT), a liquid crystal display or the like is used. Alternatively, an external display device connected to the image processing apparatus by a cable or the like may also be used as the display unit 103. In this case, the image processing apparatus itself will not have the display unit 103.

A central processing unit (CPU) 104 controls processing of the above-described respective configurations. A read only memory (ROM) 105 and the RAM 106 provide programs, data, work areas, and the like necessary to operate the CPU 104. Further, a control program necessary to execute processing which will be described below is stored in the data storage unit 102 or the ROM 105. The control program to be stored in the ROM 105 is once read into the RAM 106 and then is executed. A system bus 108 mutually connects respective units (101 to 107) so as to be communicable.

In FIG. 1, all of the input unit 101, the data storage unit 102, and the display unit 103 are contained in a single image processing apparatus. However, these units are connected through a communication channel by a known communication method. Thus, as a whole, the image processing apparatus may be configured as illustrated in FIG. 1. Further, concerning a system configuration of the image processing apparatus, other than that which has been described above, various components are present. However, these can be realized by a known method. Thus, its description will be omitted.

In color adjustment processing of an image in the present exemplary embodiment, first luminance image data on input image data is generated. Further, this luminance image data is subjected to two-dimensional filter processing to extract a low frequency component, thereby generating low frequency luminance image data. Furthermore, generation processing of the low frequency luminance image data is executed to the luminance image data with a plurality of resolutions based on the same image data. Color adjustment of image data is executed using the low frequency luminance image data obtained in this plurality of resolutions and original image data.

In order to execute color adjustment of the image data, the image processing apparatus first extracts a luminance component from the input image data. For example, when an image for color adjustment is expressed by the sRGB color space described in IEC 61966-2-1, extraction of the luminance component is executed according to a method described in IEC 61966-2-1. Specifically, for example, the image data to be expressed by the sRGB color space is transformed into image data expressed by the CIE 1931XYZ color space by performing gamma transformation and matrix operation of 3 rows and 3 columns. Pieces of data on XYZ obtained after pixel values (R(x,y), G(x,y), B(x,y)) whose position is (x,y) have been transformed by the above transformation are referred to as X(x,y), Y(x,y), and Z(x,y), respectively. Thus, Y(x,y) is a luminance component to be extracted, and X (x,y) and Z(x,y) are color components. When this luminance extraction is configured by hardware, the hardware can be configured by, for example, a table reference circuit (portion of gamma transformation) by a lookup table and a matrix operation circuit for performing matrix operation.

When the luminance component is extracted, the above-described gamma transformation may be omitted, thereby only performing the matrix operation. Further, instead of the CIE 1931XYZ color space, the sRGB color space may also be transformed into the following color spaces:

YCbCr color space (Y value denotes luminance component, and Cb and Cr values denote color component)
L*a*b* color space (L* value denotes luminance component, and a* and b* values denote color component)
HSV color space (V value denotes luminance component, and H and S values denote color component)
HSL color space (L value denotes luminance component, and H and S values denote color component)

In the respective color spaces, the corresponding color space transformation processing is performed.

As color space transformation, it is useful to use color space transformation which is defined by a standard or the like. However, approximate calculation may also be used. For example, transformation from the RGB color space into the YCbCr color space is represented by a transformation equation given by the following equation (1):

$$Y = 0.299R + 0.587G + 0.114B \quad (1)$$

Contrary to this, an approximate equation as the following equation (2) may also be used:

$$Y = (3R + 6G + B)/10 \quad (2)$$

Further, as an approximate value of the luminance component, G of an RGB signal value may also be used. As luminance, an average or a maximum value of the RGB signal value may also be used.

Furthermore, in the present exemplary embodiment, it has been described as the input image data is represented by the sRGB color space. However, even if the color space is RGB (e.g., Adobe RGB, RIMM/ROMM RGB etc.) other than sRGB, the RGB color space can be transformed into CIE 1931XYZ (or other color spaces described above) according to the definition of respective color spaces.

In the transformation of the color space, transformation may also be performed according to the definition of each color space or the transformation equation. The transformation may also be performed using a known International Color Consortium (ICC) profile or the like. For example, when RGB is an RGB value (device RGB value) depending on a device and the RGB value cannot be expressed by a simple transformation equation, it is particularly effective to use the ICC profile.

Still furthermore, even if the input image data is not expressed by RGB but is expressed by, for example, sYCC, color space transformation may similarly be performed using a color space transformation equation from sYCC into CIE 1931XYZ (or other color spaces described above) or transformation by the ICC profile.

However, when the original color space is consistent with the color space of the luminance value such that the input data is expressed by sYCC and also Y in YCbCr is used as luminance, Y value in sYCC of the input image data may simply be removed. Thus, color space transformation processing is unnecessary.

As an example of color adjustment processing, according to a method discussed in Jobson., et al., "A Multiscale Retinex for Bridging the Gap between Color Images and the Human Observation of Scenes", IEEE TRANSACTIONS ON IMAGE PROCESSING, Vol. 6, No. 7, July 1997, each of a distribution of a luminance component and a distribution of a luminance component subjected to scale transformation is logarithmically converted to output its difference. Further, a weighted average of output of the difference in a different scale (different resolution) is calculated to provide the luminance component the weighted average of which has been improved. However, in this method, a degree of improvement cannot be adjusted corresponding to an image. Accordingly, logarithmic conversion output of the luminance component subjected to scale transformation is multiplied by a coefficient. This coefficient is a parameter for adjusting the degree of improvement. The output of the luminance component improved based on the above-described processing is given by the following equation (3):

$$Y'(x, y) = \sum_n W_n \left\{ \gamma_0 \cdot \log Y(x, y) - \gamma_1 \cdot \log \left[ \frac{F_n(x, y) *}{Y(x, y)} \right] \right\} \quad (3)$$

where Y'(x,y), $F_n$(x,y), $W_n$, and n are parameters representing an output of the improved luminance component in coordinate (x,y), Gaussian function in coordinate (x,y), weight between scales, and a scale, respectively, $\gamma_0$ and $\gamma_1$ are a parameter 0 which represents the degree of improvement (extent) and a parameter 1 which represents the degree of improvement (extent), respectively, and an asterisk * represents product-sum operation.

The weight $W_n$ between scales can be omitted by adjusting the standard deviation of the scales (weight $W_n$ is replaced with simple average). Further, it is known that a return to the original luminance unit by inverse transformation (exponential (exp) operation) is more useful as image quality of the improved image data than output of the logarithmically converted value as equation (3). Accordingly, it is more useful to set the output expressed in the following equation (4) to the improved luminance component:

$$Y'(x,y) = \exp(\gamma_0 \cdot \log Y(x,y) - \gamma_1 \cdot Avg\{\log [F_n(x,y)*Y(x,y)]\}) \quad (4)$$

where Avg represents average value calculation.

Further, instead of equation (4), the following equation (5) may be given:

$$Y'(x, y) = \frac{Y(x, y)^{\gamma_0}}{[Avg\{F_n(x, y) * Y(x, y)\}]^{\gamma_1}} \quad (5)$$

Average value calculation of scale transformation output in a plurality of scales may be performed by low frequency luminance signal extraction processing to set the average value of the scale transformation output in the plurality of scales to a distribution of the luminance component subjected to scale transformation. Further, as an equation which obtains a similar effect to this equation, the following equation (6) may also be used:

$$Y'(x, y) = Avg\left[\frac{Y(x, y)^{\gamma_0}}{\{F_n(x, y) * Y(x, y)\}^{\gamma_1}}\right] \quad (6)$$

When this luminance transformation is configured by hardware, for example, an average value calculation circuit, a circuit which generates a lookup table, a table storage unit, a table reference circuit (part of gamma transformation), and a division circuit can be used. The average value calculation circuit may be provided on the unit configured to realize low frequency luminance signal extraction.

In color adjustment processing, a color component is modified according to the change of the luminance component so that the color of the image data after processing is not changed as much as possible. For example, it is useful that color components X (X,Y) and Z (x,y) multiply by a ratio Y'(x,y)/Y(x,y) before and after the change of the luminance component respectively. Alternatively, only Y(x,y) is changed into Y'(x,y) by equation (5) or equation (6), and processing is not performed to the color components X (x,y) and Z (x,y). Thus, the processing can easily be simplified.

Then, data on X, Y and Z after modification is subjected to color space transformation to determine data in sRGB. The processing is inverse transformation of color space transformation processing. Accordingly, matrix operation of 3 rows and 3 columns and processing of inverse gamma transformation are performed, thereby obtaining outputs in sRGB each of which has 8 bits. When a reconstruction of this image data is configured by hardware, for example, a multiplication circuit, a division circuit, a matrix operation circuit, and a table reference circuit by a lookup table (part of inverse gamma transformation) can be used. Alternatively, a ratio Y'(x,y)/Y (x,y) before and after the change of the luminance component may be calculated as described above to apply it to an RGB signal respectively.

Figure 4:
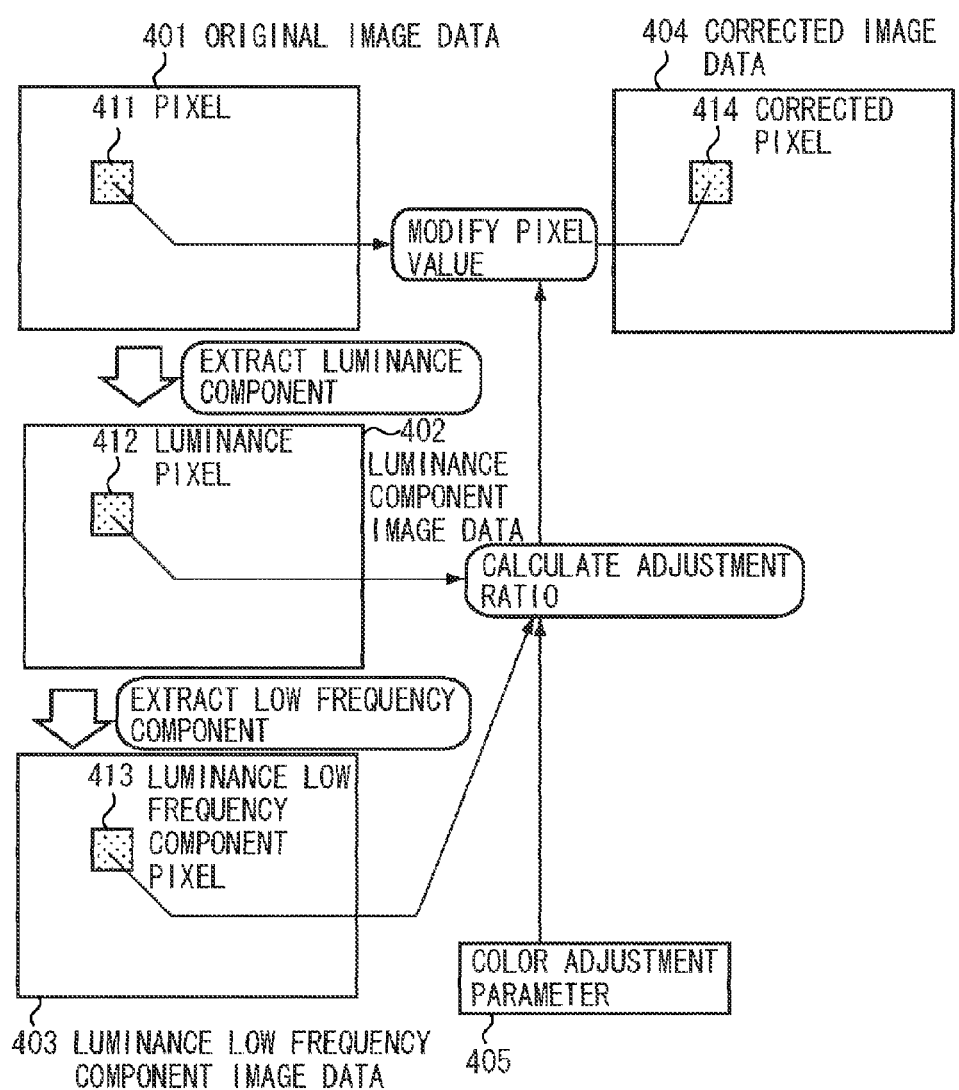
FIG. 4 is a diagram conceptually illustrating an example of a relation between color adjustment processing and each data.

FIG. 4 is a diagram conceptually illustrating an example of a relation between color adjustment processing and each data. FIG. 4 includes original image data 401 before color adjustment, luminance component image data 402 obtained by transforming the original image data 401 into a luminance component, and luminance low frequency component image data 403 obtained by performing low frequency component extraction processing to the luminance component image data 402. The low frequency component extraction can be realized using known low-pass filtering processing. Further, FIG. 4 includes corrected image data 404 of the result of performing color adjustment to the original image data 401.

Furthermore, a pixel 411 represents a certain pixel of the original image data 401. A luminance pixel 412 corresponds to the pixel 411 and corresponds to Y(x,y) in equation (4) to equation (6). A luminance low frequency component pixel 413 corresponds to the pixel 411 and corresponds to $F_n(x,y)$ *Y(x,y) in equation (4) to equation (6). Still furthermore, FIG. 4 includes a corrected pixel 414 of the result of color processing of the pixel 411.

Further, a color adjustment parameter 405 is equivalent to $\gamma_0$ and $\gamma_1$ in equation (4) to equation (6). For example, a user may operate the input unit 101 to designate the value of these color adjustment parameters to a GUI displayed on the display unit 103. Alternatively, a color adjustment parameter may be determined in the image processing apparatus (system) in advance to apply it thereto. Furthermore, several color adjustment parameters to be determined in the image processing apparatus (system) in advance is prepared. Then, an option of these parameter settings may be presented on the display unit 103 in a form (e.g., "strong", "medium", "weak" or the like) that a user can recognize to cause the user to select it.

As illustrated in FIG. 4, when color adjustment of a certain pixel 411 is performed, an adjustment ratio is calculated using the luminance pixel 412, the luminance low frequency component pixel 413, and the color adjustment parameter 405. This adjustment ratio is Y'(x,y)/Y(x,y) calculated according to equation (4) to equation (6). Further, color adjustment is performed using this adjustment ratio and a pixel value of the pixel 411 to obtain the corrected pixel 414.

In FIG. 4, when the original image data 401 is the same size as the luminance component image data 402 or the luminance low frequency component image data 403 is indicated as an example. However, the size of these image data may be consistent with each other. In this case, the luminance component image data 402 and the luminance low frequency component image data 403 may be scaled into the same size as the original image data 401 by a known scaling method. Further, the luminance component image data 402 may be set to intermediate image data for generating the luminance low frequency component image data 403 to repeatedly extract a luminance component from the original image data 401 in process of color adjustment.

Figure 2:
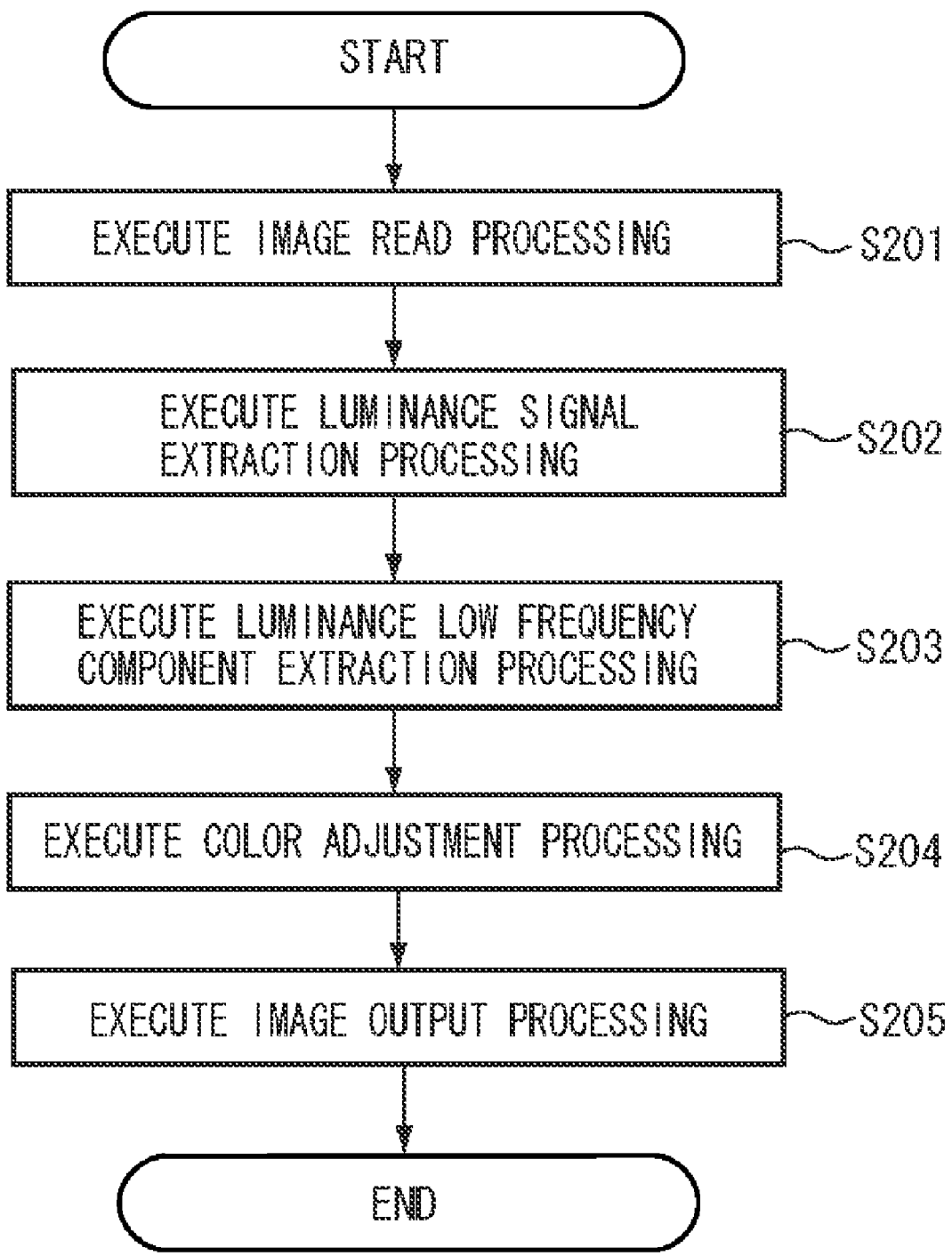
FIG. 2 is a flowchart illustrating an example of image processing in an image processing apparatus.

FIG. 2 is a flowchart illustrating an example of image processing in the image processing apparatus. In the present exemplary embodiment, when a pixel value of input image data and a pixel value of output image data after color adjustment are prescribed by the sRGB color space, and luminance and a color are prescribed by the sYCC color space transforming sRGB will be described as an example. Further, in the present exemplary embodiment, two or more low frequency components different in frequency band are used in color adjustment. However, to simplify description, an example when one luminance low frequency component is used in color adjustment will be described using FIG. 2. Thereafter, an example when two or more luminance low frequency components different in frequency band are used will be described.

Image data for color adjustment processing by the flowchart illustrated in FIG. 2 is stored in the RAM 106 or the data storage unit 102 illustrated in FIG. 1. When the image data for color adjustment processing is designated, for example, a list of image data to be stored in the RAM 106 or the data storage unit 102 is displayed on the display unit 103. Then, a user may operate the input unit 101 to designate a desired image from within the list of its image data.

Also, an image input unit (not shown) such as a known charge coupled device (CCD) is further provided on the configuration in FIG. 1. Then, a user operates the input unit 101. This operation acts as a trigger. Input of the image may be performed from the image input unit to store the image data in the RAM 106 or the data storage unit 102. In this case, storage of the image data in the RAM 106 or the data storage unit 102 acts as a trigger. Then, processing by the flowchart illustrated in FIG. 2 can be performed. Further, communication may also be executed with other image processing apparatuses (not shown) via the communication unit 107 to receive the image data. In this case, the communication unit 107 receives the image data. This acts as a trigger. Then, processing by the flowchart illustrated in FIG. 2 may be performed.

First, in step S201, the image processing apparatus reads the original image data 401 for color adjustment processing to execute image read processing that develops the original image data 401 in the RAM 106 or the data storage unit 102. This reading of the original image data 401 is executed according to a format by which an image is stored. At this time, when image compression processing is executed as, for example, known Joint Photographic Experts Group (JPEG), the image processing apparatus expands to develop it, thereby developing it in the RAM 106 or the data storage unit 102.

When an image of a RAW (or CCD-RAW) format by which an object optical image is subjected to photoelectric conversion by, for example, a known image sensor and then data subjected to analog-to-digital conversion is stored is read, the processing is performed as follows. After the image processing apparatus has written the image data to the RAM 106 according to the format which is prescribed by the RAW format, as needed, pixel interpolation processing, and image processing such as γ and white balance are performed. A parameter of this image processing of γ and white balance can be applied with a predetermined value. However, when a parameter of image processing corresponding to information in process of image capture or a state in its image capture is stored in the RAW image format, the image processing apparatus can read the parameter of image processing to apply it. Even if the parameter of image processing is not directly stored, when identification data on an imaging model and setting information in process of image capture are contained, the parameter of image processing corresponding to the identification data on its imaging model and the setting information in process of image capture can be read. In other words, the parameter of the image processing corresponding to the identification data on the imaging model and the setting information in process of image capture is stored in the ROM 105 or the data storage unit 102 in advance as a database. Then, the CPU 104 collates the identification data on the imaging model and the setting information in process of image capture with the database, thereby allowing the parameter of the image processing to be identified and applied thereto.

Next, in step S202, the image processing apparatus executes luminance signal extraction processing. This luminance signal extraction processing is processing of extracting a luminance component from each pixel of the original image data 401 read in step S201 to generate the luminance component image data 402. In the present exemplary embodiment, a pixel value of the image data is prescribed by the sRGB color space and luminance of the image data is prescribed by the sYCC color space. Accordingly, the image processing apparatus calculates a luminance component of data on the original image data 401 using a transformation equation of the above-described equation (1) or an approximate equation of equation (2). Then, the image processing apparatus stores the luminance component image data 402 in the RAM 106 or the data storage unit 102.

As described above, the size of the original image data 401 is not required to be consistent with the size of the luminance component image data 402. Accordingly, in the luminance component extraction processing in this step S202, contraction processing may also be performed. The contraction processing may be known any methods and can easily be realized by, for example, thinning processing, a nearest neighbor method, an average value method, or the like.

Next, in step S203, the image processing apparatus extracts a low frequency component of the luminance component image data 402 generated in step S202 to generate the luminance low frequency component image data 403. The extraction of the low frequency component may be executed by known any low-pass filtering processing.

Next, in step S204, the image processing apparatus executes color adjustment processing using the original image data 401 read in step S201, the luminance component image data 402 generated in step S202, and the luminance low frequency component image data 403 generated in step S203. The detail of this color adjustment processing will be described below.

Next, in step S205, the image processing apparatus stores the corrected image data 404 obtained by the result of color adjustment processing in step S204 in the RAM 106 or the data storage unit 102 according to the predetermined image format. The image processing apparatus may also transmit the corrected image data 404 to other image processing apparatuses (not shown) via the communication unit 107. Further, in the present exemplary embodiment, when one low frequency luminance component is used is illustrated as an example. However, a plurality of low frequency luminance components different in frequency band can be used.

Figure 6:
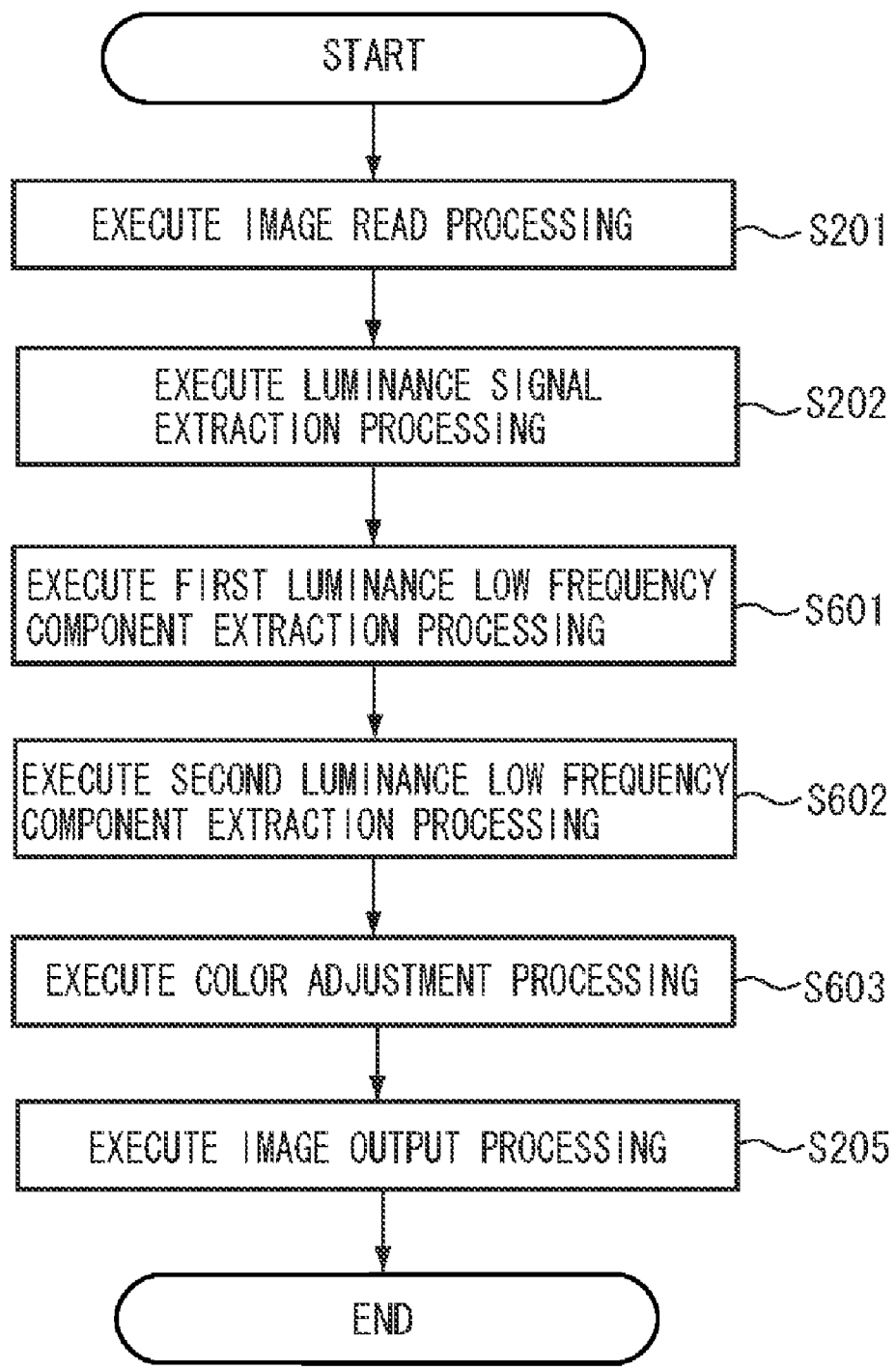
FIG. 6 is a flowchart illustrating a first example of image processing in an image processing apparatus when a plurality of low frequency luminance components different in frequency band is used.

FIG. 6 is a flowchart illustrating a first example of image processing in the image processing apparatus when a plurality of low frequency luminance components different in frequency band is used. In FIG. 6, processing similar to that in FIG. 2 is provided with the same reference numeral as that in FIG. 2 and its detail description will be omitted.

In the processing in FIG. 6, after the luminance signal extraction processing in step S202, the image processing apparatus executes first luminance low frequency component extraction processing in step S601 and second luminance low frequency component extraction processing in step S602. A low frequency component band to be extracted is different between step S601 and step S602. In other words, only a filter size of a low-pass filter is different between step S601 and step S602, and other processing is similar to that in step S203 illustrated in FIG. 2.

Next, in step S603, the image processing apparatus executes color adjustment processing. In FIG. 4, one luminance low frequency component image data 403 is used to the original image data 401. Contrary to this, in FIG. 6, a plurality of luminance low frequency component image data different in frequency band is used. This processing is different from that in step S403 illustrated in FIG. 4.

In this case, the image processing apparatus combines the plurality of luminance low frequency component image data different in frequency band in advance, generates combined luminance low frequency component image data, and uses a pixel value of the combined luminance low frequency component image data (combined luminance low frequency component pixel value) instead of the pixel value of the luminance low frequency component image data 403. Combining of the plurality of luminance low frequency component image data different in frequency band may be performed with, for example, weighted addition operation to the luminance low frequency component image data on each resolution.

In addition to this, the image processing apparatus calculates an adjustment ratio corresponding to the plurality of luminance low frequency component image data different in frequency band (or luminance low frequency component pixel) by the plurality of luminance low frequency component image data different in frequency band, the luminance component image data and a color processing parameter, respectively. Then, the image processing apparatus may combine the calculated respective adjustment ratios. The combining of the respective adjustment ratios may be performed with, for example, weighted addition operation to the respective adjustment ratios.

Further, in addition to this, the image processing apparatus calculates an adjustment ratio corresponding to the plurality of luminance low frequency component image data different in frequency band (or luminance low frequency component pixel) respectively as describe above. Then, the image processing apparatus may obtain each of corrected image data (corrected pixel) of the result of color adjustment corresponding to the plurality of luminance low frequency component image data different in frequency band using the original image data 401 and each adjustment ratio to combine pixel values of each corrected image data. Combining of the pixel values of each corrected image may be performed with, for example, weighted addition operation to the pixel value of a pixel corresponding to each corrected image data.

In FIG. 6, when the luminance low frequency component image data different in frequency band has been set to two has been illustrated as an example. However, the number of luminance low frequency component image data different in frequency band is not limited to two but may be three or more. In such a case, after steps S601 and S602, low frequency component extraction processing different in frequency band may be added by a needed number.

Figure 7:
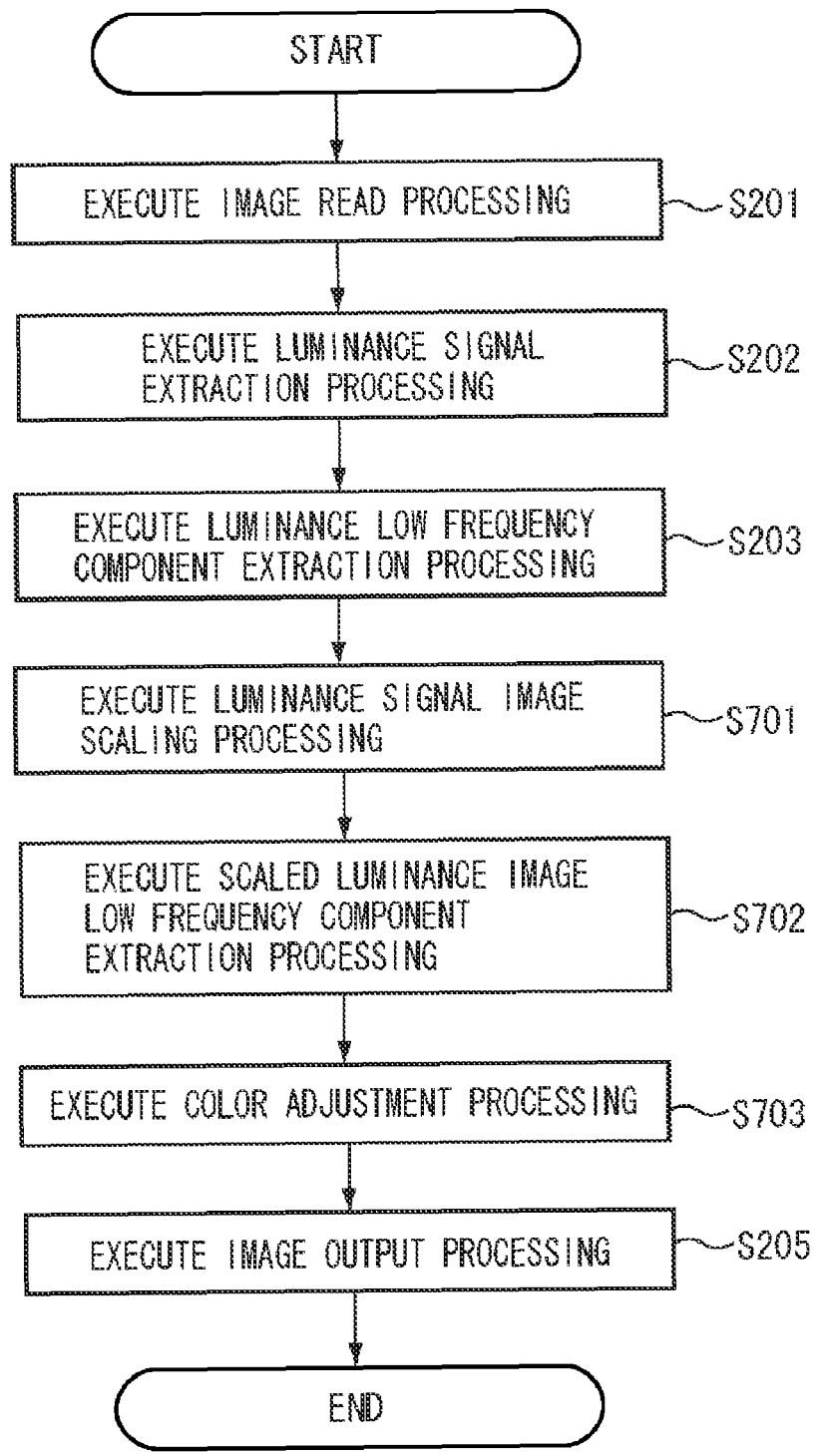
FIG. 7 is a flowchart illustrating a second example of image processing in an image processing apparatus when a plurality of low frequency luminance components different in frequency band is used.

Further, instead of the processing in FIG. 6, processing in FIG. 7 can also be executed. FIG. 7 is a flowchart illustrating a second example of image processing in the image processing apparatus when a plurality of low frequency luminance components different in frequency band is used. In FIG. 7, processing similar to that in FIG. 2 is provided with the same reference numeral as that in FIG. 2 and its detail description will be omitted. In the processing in FIG. 6, the plurality of luminance low frequency component image data different in frequency band has been used. However, in the processing in FIG. 7, a plurality of luminance low frequency component image data different in resolution is used.

In the processing in FIG. 7, after the luminance low frequency component extraction processing in step S203, the image processing apparatus executes luminance signal image scaling processing in step S701. The luminance signal image scaling processing is processing of inputting the luminance component image data 402 generated in step S202, executing scaling processing (contraction processing), and obtaining scaled luminance component image data. The scaling method may be a known scaling method.

In subsequent step S702, the image processing apparatus inputs the scaled luminance component image data generated in step S701, executes processing similar to the low frequency component extraction processing in step S203, and obtains scaled luminance low frequency component image data. At this time, the frequency band of the low frequency component is the same as the frequency band in the luminance low frequency component extraction processing in step S203. In other words, a filter size of a low-pass filter to be used in step S203 is the same as a filter size of a low-pass filter to be used in step S702.

Next, in step S703, the image processing apparatus executes color adjustment processing. The color adjustment processing is similar to that in FIG. 6 in that a plurality of luminance low frequency component image data is included. However, the processing in FIG. 7 is different in that resolution of each luminance low frequency component image data is not uniform. In this case, before color adjustment processing, after the luminance low frequency component image data on low resolution is enlarged, processing may be executed similar to that which has been described in description of the processing in FIG. 6. As a method for enlarging the image data, a known scaling method can be employed. Further, prior to color adjustment processing, enlargement processing of the scaled luminance low frequency component image may be performed and the enlarged scaled luminance low frequency component image may also be stored in the RAM 106.

In FIG. 7, the case where two pieces of luminance low frequency component image data different in resolution are used has been illustrated as an example. However, the number of luminance low frequency component image data different in resolution is not limited to two but may also be three or more. In such a case, in the flowchart illustrated in FIG. 7, after step S701, the low frequency component extraction processing different in resolution may be added by a needed number.

Those are a brief example of image processing to be executed by the image processing apparatus. Subsequently, overcorrection (hereinafter, referred to as halo phenomenon) that occurs within the boundary between the bright section and the dark section of an image will be described, which is an issue intended to be solved in the present exemplary embodiment.

Figure 3:
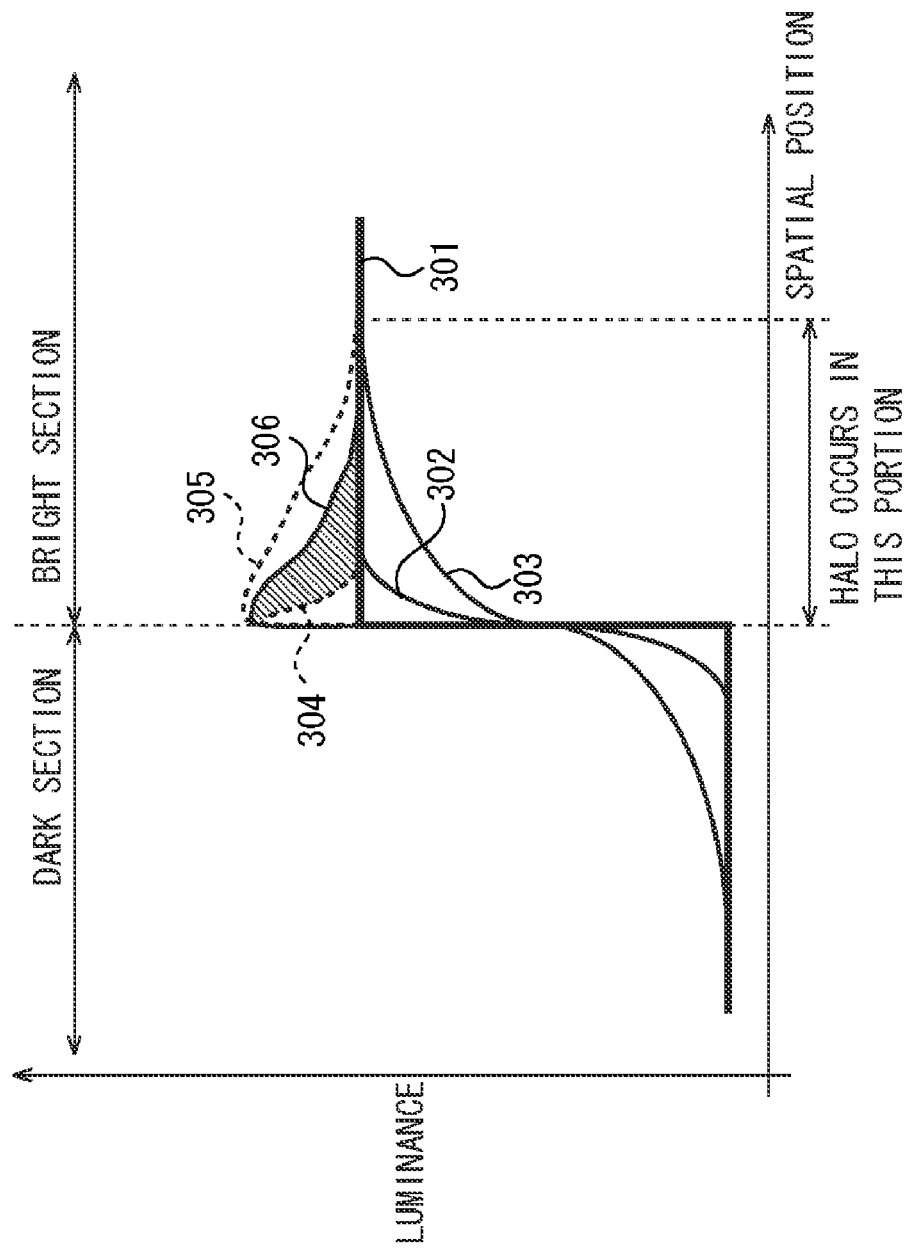
FIG. 3 is a diagram illustrating an example of a halo phenomenon.

FIG. 3 is a diagram illustrating an example of a halo phenomenon. FIG. 3 includes an original signal value 301 (signal value or luminance value of original image), a luminance low frequency component signal value 302 which contains a relatively high frequency component (in the following description, as needed, it is abbreviated to luminance low frequency component (high)), a luminance low frequency component signal value 303 which contains a relatively low frequency component (in the following description, as needed, it is abbreviated to luminance low frequency component (low)), and results 304 and 305 of executing color adjustment processing to the original signal value 301 according to equation (4) to equation (6) described above. Specifically, the result 304 is a signal value of the result of executing color adjustment using the luminance low frequency component (high) 302 (in the following description, as needed, it is abbreviated to corrected result signal (high)). The result 305 is a signal value of the result of executing color adjustment using the luminance low frequency component (low) 303 (in the following description, as needed, it is abbreviated to corrected result signal (low)). Further, the result 306 is a finally corrected signal value obtained by combining the results of color adjustment of the corrected result signal (high) 304 and the corrected result signal (low) 305.

According to equation (4) to equation (6), in the portion where a value of the luminance low frequency component signal value is low, the original signal value 301 is brightly corrected by a relatively large gain. Conversely, in the portion where a value of the luminance low frequency component signal value is high, the original signal value 301 is corrected by a relatively small gain. As illustrated in FIG. 3, on the bright section side within the boundary between the bright section and the dark section, also in a portion receding from the boundary, a value of the luminance low frequency component signal value is made low. In other words, as the low frequency luminance component signal includes a lower frequency component, even away from the boundary between the bright section and the dark section, the signal value is made low (even away from the boundary between the bright section and the dark section, the signal value of the luminance low frequency component (low) 303 is lower than that of the luminance low frequency component (high) 302). Accordingly, in this portion, a correction by a relatively large gain occurs. Thus, its result is recognized as the halo phenomenon.

Such the halo phenomenon occurs until the portion apart from the bright and dark area. In the conspicuous area, the following expression (7) or expression (8) holds.

"gain value by luminance low frequency component (high)302"<"gain value by luminance low frequency component(low)303" (7)

"corrected signal(high)304"<"corrected signal(low) 305" (8)

Further, at this time, in the finally corrected signal value 306 to be obtained by combining, the smaller the contribution of an effect of correction by the luminance low frequency component (low) 303 is made, the smaller the area where the halo phenomenon occurs becomes, and the harder the recognition of the halo phenomenon becomes.

Figure 5:
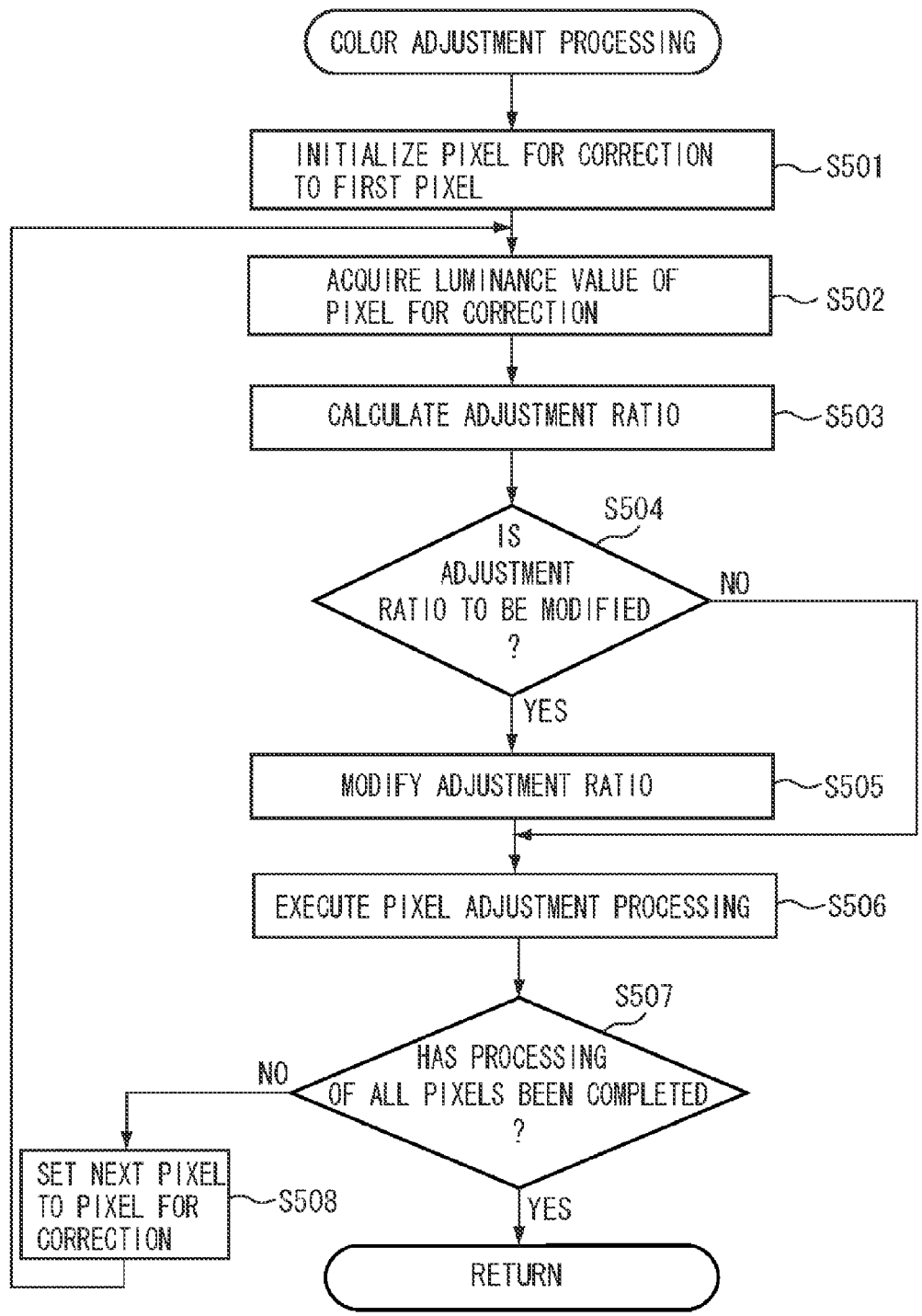
FIG. 5 is a flowchart illustrating an example of processing of an image processing apparatus when correction processing (color adjustment processing) is performed.

Subsequently, referring to the flowchart of FIG. 5, an example of processing by the image processing apparatus when the above-described correction processing (color adjustment processing) is executed will be described. The processing in FIG. 5 is detail processing of color adjustment processing (steps S204, S603 and S703) in FIGS. 2, 6 and 7 described above. In the present exemplary embodiment, when two luminance low frequency component images different in frequency band are used will be described.

In step S501, the image processing apparatus initializes a pixel for correction to the first pixel of the luminance low frequency component image data. Next, in step S502, the image processing apparatus obtains a luminance signal value of the pixel for correction. This may extract the luminance signal value spatially consistent with the current pixel for correction from the luminance component image generated in the previous step S202. However, the luminance component may be calculated from the current pixel for correction using a transformation equation of equation (1) or an approximate equation of equation (2).

Next, in step S503, the image processing apparatus executes the following processing using the pixel value of the luminance pixel of the luminance component image corresponding to the pixel for correction, the pixel value of the luminance low frequency component pixel of the luminance low frequency component image specially corresponding to the current pixel for correction, and the color adjustment parameters $\gamma_0$ and $\gamma_1$. In other words, the image processing apparatus calculates the luminance value Y' of the pixel after correction using these, and finally calculates the adjustment ratio Y'/Y. Specifically, the image processing apparatus calculates the luminance value Y' according to equation (4) to equation (6). The pixel value of the luminance low frequency component pixel of the luminance low frequency component image data specially corresponding to the current pixel for correction is obtained in step S203 illustrated in FIG. 2 (or steps S601 and S602 in FIG. 6, and steps S203 and 5702 in FIG. 7).

Further, in the present exemplary embodiment, two or more luminance low frequency components different in frequency band are used in color adjustment. Thus, an adjustment ratio is calculated respectively. In order to calculate Y', the color adjustment parameters $\gamma_0$ and $\gamma_1$ are required. However, the color adjustment parameters $\gamma_0$ and $\gamma_1$ may be determined before this step. For example, the color adjustment parameters $\gamma_0$ and $\gamma_1$ may be determined in advance in the image processing apparatus (system) to apply it in this step S503.

Furthermore, in any timing until step S503, a process to receive designation of the color adjustment parameters $\gamma_0$ and $\gamma_1$ from a user may be provided to use the color adjustment parameters $\gamma_0$ and $\gamma_1$ received in this process. For example, the user may operate the input unit 101 to the GUI displayed on the display unit 103, thereby designating the color adjustment parameters $\gamma_0$ and $\gamma_1$.

Still furthermore, several color adjustment parameters $\gamma_0$ and $\gamma_1$ are determined in the image processing apparatus (system) in advance. Then, an option of these parameter settings may be presented to the display unit 103 in a form (e.g., "strong", "standard", "weak" or the like) that the user can recognize to allow the user to select it. In such the case, the image processing apparatus applies the color adjustment parameters $\gamma_0$ and $\gamma_1$ corresponding to selection of the user to execute processing.

Further, using a method for automatically determining the color adjustment parameters $\gamma_0$ and $\gamma_1$ from the feature amount of image data, in any timing before step S503, a process for automatically determining the color adjustment parameters $\gamma_0$ and $\gamma_1$ may also be provided.

Furthermore, in calculation for calculating Y' or Y'/Y in this step S503, a combination of an input signal to be considered in advance is calculated to subject it to a lookup table. Then, in this step S503, it may be configured so as to refer to its lookup table. A lookup table generation step may be provided in arbitrary timing before step S503 after the color adjustment parameter has been determined.

Still furthermore, at this time, when a size is different between the image data for correction, and the luminance component image data or the luminance low frequency component image data, scaling processing is performed to the luminance component image data or the luminance low frequency component image data so as to set the same size as the image data for correction. Then, referring to the pixel value of the luminance pixel of the luminance component image data after the scaling processing has been performed or the pixel value of the luminance low frequency component pixel of the luminance low frequency component image data after the scaling processing has been performed, processing is executed. The scaling processing can be realized by a known any scaling method. For example, a nearest neighbor method, bilinear interpolation or the like can be used for the scaling processing.

Next, in step S504, the image processing apparatus determines whether the adjustment ratio calculated in step S503 is modified. In this determination, it may be determined whether the following expression (9) holds as described above:

$$r_h < r_l \quad (9)$$

where an adjustment ratio (gain value) by the luminance low frequency component (high) 302 is $r_h$, and an adjustment ratio (gain value) by the luminance low frequency component (low) 303 is $r_l$.

This sign of inequality may also be included with an equal sign. If this relation holds, the determination in step S504 is true. If this relation does not hold, the determination in step S504 is false.

Further, a threshold value may be provided concerning a difference in the adjustment ratio and instead of the previous condition determination, it may also be determined whether the following expression (10) is satisfied:

$$r_h - r_l < thrA \quad (10)$$

Furthermore, instead of this, it may also be determined whether the following expression (11) is satisfied:

$$r_h \div r_l < thrB \quad (11)$$

where thrA and thrB are threshold values and may be determined in advance.

For example, prior to step S503, the threshold value can be input by a user.

In step S504, when the adjustment ratio is modified (when determination is true) (YES in step S504), the processing proceeds to step S505. Then, the image processing apparatus modifies the adjustment ratio. On the other hand, when the adjustment ratio is not modified (when determination is false) (NO in step S504), step S505 is skipped and the processing proceeds to step S506.

In step S505, the image processing apparatus executes modification of the adjustment ratio, for example, as follows. For example, the image processing apparatus can simply execute modification of the adjustment ratio as the following equation (12):

$$r_l' = r_h \quad (12)$$

where a ratio by the luminance low frequency component (low) after modification is $r_l'$.

However, it is useful to modify $r_l$ so as to bring $r_l$ close to $r_h$ such that a value is gently changed in a portion where authenticity of determination in step S504 is switched. Thus, in the present exemplary embodiment, the information processing apparatus can execute modification of the adjustment ratio as the following equation:

$$r_l' = \alpha r_h + (1.0 - \alpha) r_l \quad (13)$$

where $\alpha$ is a predetermined coefficient ($0 < \alpha \leq 1.0$).

For example, a configuration is simplified when modification of the adjustment ratio is performed as $\alpha = 0.5$ and then, "$r_l' = (r_h + r_l) \div 2$". In this equation, $\alpha$ cis set to a predetermined coefficient. However, it may be configured so as to allow a user to input $\alpha$ prior to the processing in step S505.

Next, in step S506, the image processing apparatus modifies a pixel using the adjustment ratio modified in step S505. In the present exemplary embodiment, the adjustment ratio is applied to each of RGB to obtain a pixel value of the result of adjustment. Thus, a pixel value of the result of adjustment is obtained for each luminance low frequency component. Then, these are combined to obtain the final result of adjustment.

In combining of the results of adjustment, various methods are considered. In the present exemplary embodiment, the result of adjustment obtained for each luminance low frequency component is subjected to weighted addition to obtain the result of adjustment. At this time, it is useful to obtain the result of adjustment for each luminance low frequency component so that a ratio of a weighted value to the result of adjustment of the luminance low frequency component (low) is smaller than a ratio of a weighted value to the result of adjustment of the luminance low frequency component (high). In other words, it is useful that weighting to the result of adjustment of the luminance low frequency component (low) is made lighter than weighting to the result of adjustment of the luminance low frequency component (high). However, combining of the results of adjustment is not limited to this. As the simplest method, the result of adjustment for each luminance low frequency component may also be averaged and then, combined.

In the present exemplary embodiment, the case where the adjustment ratio is applied to each of RGB to obtain the result of adjustment has been described as an example. However, it is not necessarily to perform like this. It can also be configured so as to combine correction processing between the RGB color space and the YCC color space.

Next, in step S507, the image processing apparatus determines whether processing has been completed for all pixels. As the result of this determination, if the processing has been completed for all pixels (when result of determination is true) (YES in step S507), processing in the flowchart illustrated in FIG. 5 ends. On the other hand, if the processing has not been completed for all pixels (when result of determination is false) (NO in step S507), the processing proceeds to step S508. Then, the image processing apparatus sets a next pixel to a target pixel (pixel for correction). Then, the processing returns to step S502.

In the present exemplary embodiment, the image processing apparatus has compared the adjustment ratio in step S504 and determined. However, comparison may be performed using a pixel value after adjustment. Y' when Y'/Y is calculated as the adjustment ratio may also be compared.

Figure 9:
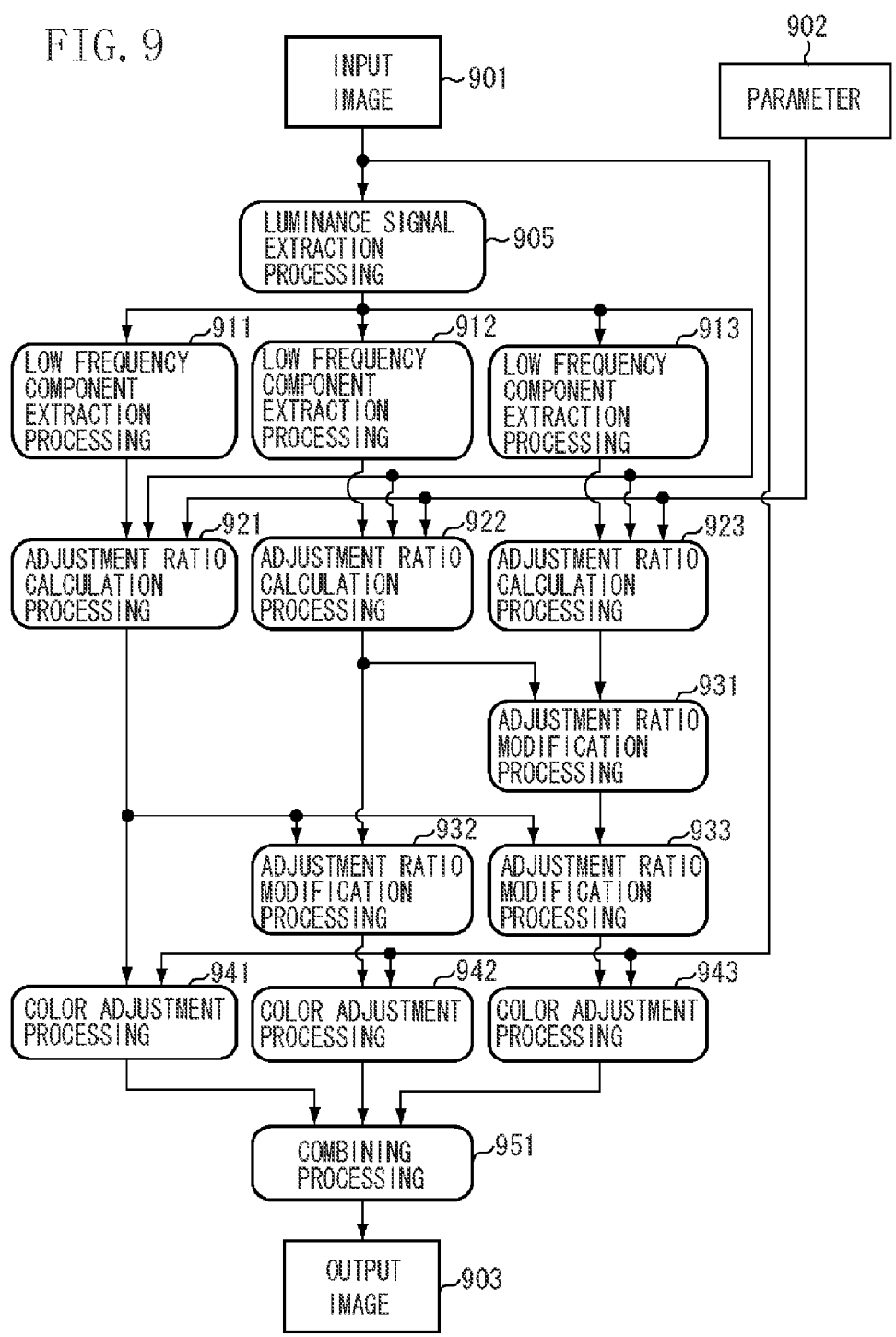
FIG. 9 is a block diagram illustrating an example of image processing in an image processing apparatus.

FIG. 9 is a block diagram illustrating an example of image processing in the image processing apparatus described above. The illustration in FIG. 9 includes an input image 901, a parameter 902 for controlling this processing, an output image 903 of the result of correction, and processing 905 for extracting a luminance component of the input image 901 which is the processing corresponding to step S202 in FIG. 2. The illustration in FIG. 9 further includes low frequency component extraction processing blocks 911 to 913. Frequency characteristics of the low frequency component to be extracted in the low frequency component extraction processing blocks 911 to 913 are different. In the present exemplary embodiment, the low frequency component extraction processing 911 extracts a low frequency component (in the following description, as needed, referred to as low frequency component H) having a relatively highest frequency characteristic. Further, the low frequency component extraction processing 913 extracts a low frequency component (in the following description, as needed, referred to as low frequency component L) having a relatively lowest frequency characteristic. Furthermore, the low frequency component extraction processing 912 extracts a low frequency component (in the following description, as needed, referred to as low frequency component M) having an intermediate frequency characteristic there between. These low frequency component extraction processing blocks 911 to 913 correspond to step S203 in FIGS. 2 and 7 and steps S601 and S602 in FIG. 6.

Adjustment ratio calculation processing blocks 921 to 923 refer to a luminance value extracted by the respective low frequency component extraction processing blocks 911 to 913 and a luminance value of the input image 901 to calculate an adjustment ratio. The adjustment ratio calculation processing blocks 921 to 923 correspond to processing in step S204 illustrated in FIG. 2 (particularly, step S503 in FIG. 5). In the following description, the adjustment ratio calculated by the adjustment ratio calculation processing blocks 921, 922 and 923 are referred to as an adjustment ratio H, an adjustment ratio M, and an adjustment ratio L, respectively.

Adjustment ratio modification processing blocks 931 to 933 modify the adjustment ratio. The adjustment ratio modification processing 931 is processing of modifying the adjustment ratio L by the adjustment ratio M and the adjustment ratio L. The adjustment ratio modification processing 932 is processing of modifying the adjustment ratio M by the adjustment ratio H and the adjustment ratio M. The adjustment ratio modification processing 933 is processing of modifying the adjustment ratio L by the adjustment ratio H and the adjustment ratio L modified by the adjustment ratio modification processing 931. These adjustment ratio modification processing 931 to 933 blocks correspond to steps S504 and S505 in FIG. 5.

Color adjustment processing blocks 941 to 943 correct the input image 901 by the adjustment ratio which has been determined up to here. The color adjustment processing blocks 941 to 943 correspond to step S506 in FIG. 5.

Combining processing 951 combines the results of correction by the color adjustment processing blocks 941 to 943. In the combining processing 951, processing such as the weighted average is performed to each image generated in the color adjustment processing blocks 941 to 943, each image is combined, and one output image 903 is obtained.

In FIG. 9, the case where three types of low frequency component extraction processing blocks 911 to 913 are executed has been described as an example. However, the low frequency component extraction processing is not limited to three types. When the low frequency component extraction processing is two types or more, any number can be adopted.

Further, in FIG. 9, the case where the color adjustment processing blocks 941 to 943 are applied to all combinations of the adjustment ratio H, the adjustment ratio M and the adjustment ratio L has been described as an example. However, at least one adjustment ratio modification processing may be executed.

Furthermore, in FIG. 9, the case where two types of adjustment ratio are input to determine whether to modify the adjustment ratio in the adjustment ratio modification processing blocks 931 to 933 has been described as an example. However, three types or more of adjustment ratio can also be input to determine whether to modify the adjustment ratio in the adjustment ratio modification processing blocks 931 to 933. For example, when the adjustment ratio H, the adjustment ratio M and the adjustment ratio L is input and "adjustment ratio H≦adjustment ratio M≦adjustment ratio L" holds, the adjustment ratio L and the adjustment ratio M, or either thereof can be modified. Still furthermore, in the present exemplary embodiment, the case where the adjustment ratio is modified has been described as an example. However, instead of the adjustment ratio, the result of color adjustment may also be modified.

Figure 8:
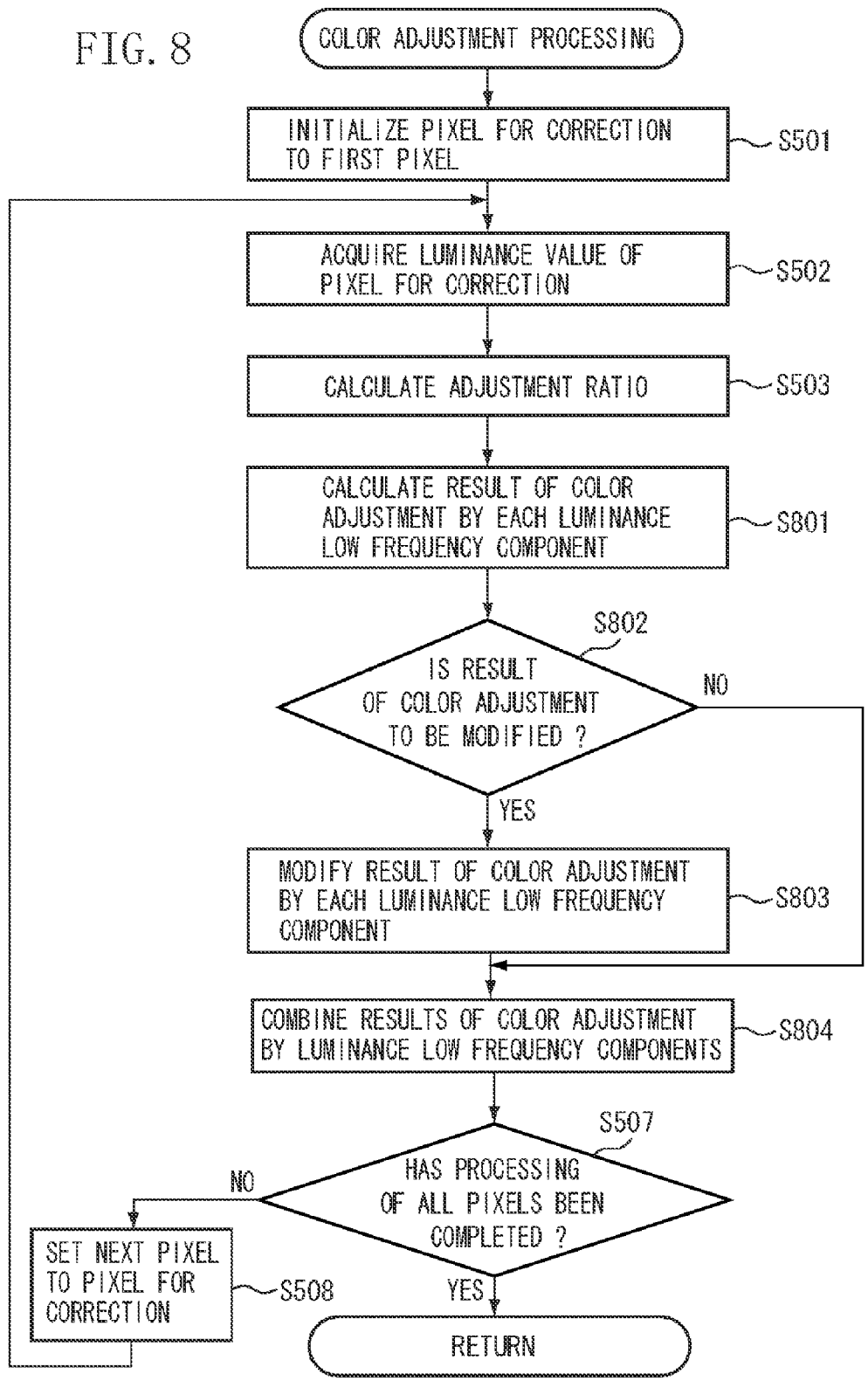
FIG. 8 is a flowchart illustrating an example of an image processing apparatus when color adjustment processing for modifying the result of color adjustment is performed.

Referring to the flowchart of FIG. 8, an example of the image processing apparatus when color adjustment processing of modifying the result of color adjustment is executed will be described. In FIG. 8, processing similar to that in FIG. 5 is provided with the same reference numeral as that in FIG. 5 and its detail description will be omitted.

In the processing in FIG. 8, the image processing apparatus obtains a pixel value (result of color adjustment) which is the result of once executing color adjustment of luminance low frequency component images using the adjustment ratio in step S801 after the adjustment ratio has been calculated in step S503.

Next, in step S802, the image processing apparatus compares the result of color adjustment obtained in step S801 to determine whether the result of color adjustment is modified. An RGB pixel value of the result of color adjustment by the luminance low frequency component (high) is set to ($R_h$, $G_h$, $B_h$) and an RGB pixel value of the result of color adjustment by the luminance low frequency component (low) is set to ($R_l$, $G_l$, $B_l$). Then, the image processing apparatus compares either group of $R_h$ and $R_l$, $G_h$ and $G_l$, and $B_h$ and $B_l$ for determination. For example, when comparing $G_h$ and $G_l$, the image processing apparatus may determine whether the following expression (14) holds.

$$G_h < G_l \qquad (14)$$

Further, a sign of inequality of this determination expression may also be included with an equal sign. If this relation holds, determination in step S802 is true. If this relation does not hold, determination in step S802 is false.

Furthermore, similar to when the adjustment ratio is compared to determine whether to modify the adjustment ratio, also when the result of color adjustment is compared to determine whether to modify the result of color adjustment, it can also be deformed so as to use a threshold value.

Then, when the processing proceeds to step S803 (YES in step S802), the image processing apparatus modifies a pixel value of the result of color adjustment. In the present exemplary embodiment, the image processing apparatus modifies the pixel value of the result of color adjustment by the following equations (15) to (17) according to a predetermined coefficient β (0<β≦1.0).

$$R_l' = \beta R_h + (1.0 - \beta) R_l \qquad (15)$$

$$G_l' = \beta G_h + (1.0 - \beta) G_l \qquad (16)$$

$$B_l' = \beta B_h + (1.0 - \beta) B_l \qquad (17)$$

Next, in step S804, the image processing apparatus combines the pixel values of the result of color adjustment after modification and obtains a final pixel value of the result of color adjustment. This processing may be the same as the combining processing in step S506 illustrated in FIG. 5.

Further, the image processing apparatus does not modify the adjustment ratio or the pixel value of the result of adjustment but may also deform so as to modify weighting of weighted addition in step S506 illustrated in FIG. 5.

Figure 10:
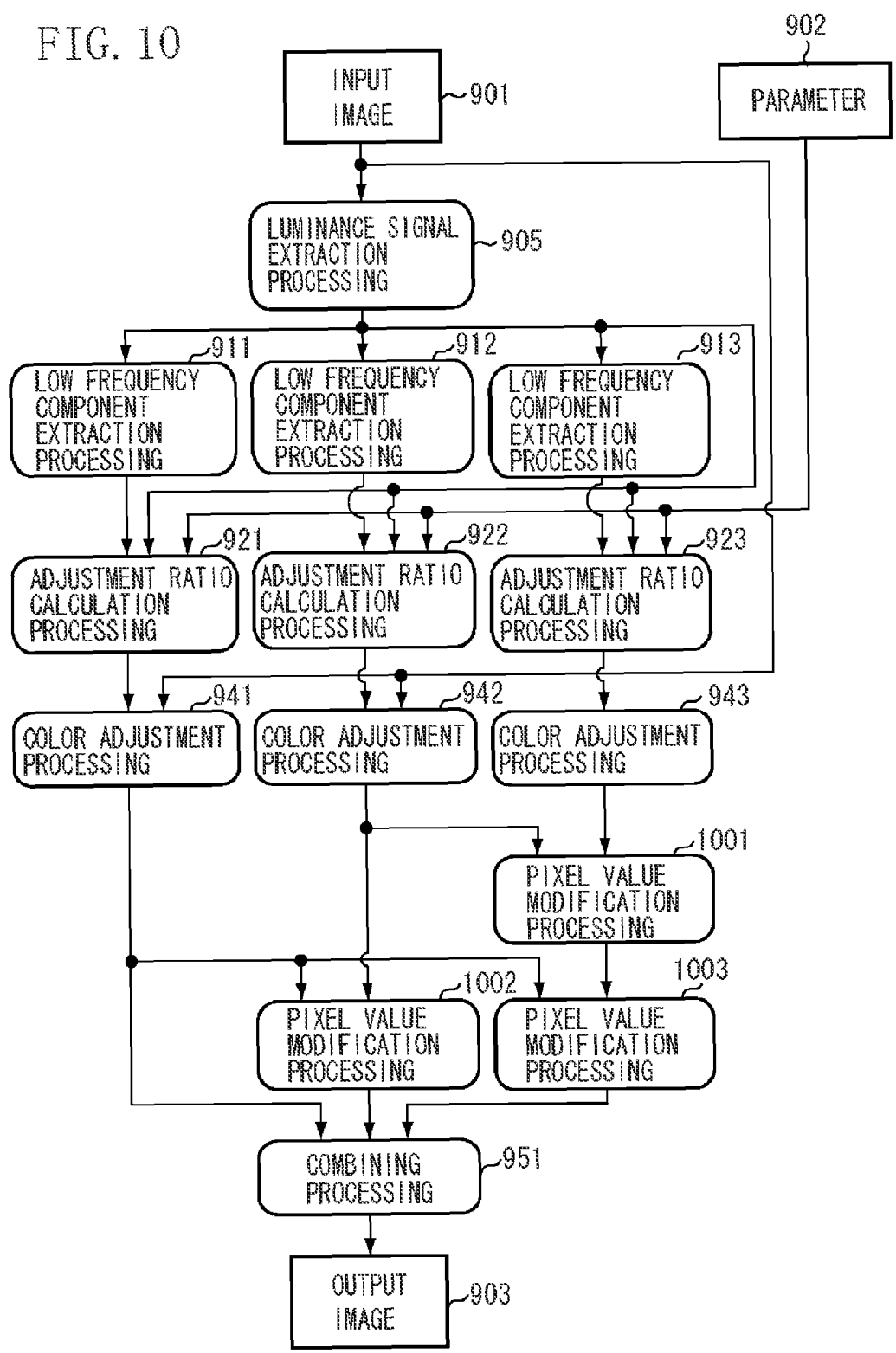
FIG. 10 is a block diagram illustrating an example of image processing in an image processing apparatus.

FIG. 10 is a block diagram illustrating an example of image processing in the image processing apparatus described above. In FIG. 10, processing similar to that in FIG. 9 is provided with the same reference numeral as that in FIG. 9 and its detail description will be omitted.

In FIG. 10, the color adjustment processing blocks 941 to 943 are similar to those which have been described in FIG. 9 except for input of the adjustment ratio before modification. Further, in the present exemplary embodiment, the pixel values of the result of color adjustment generated in the color adjustment processing blocks 941 to 943 are referred to as an adjustment result pixel value H, an adjustment result pixel value M, and adjustment result pixel value L, respectively.

Pixel value modification processing blocks 1001 to 1003 modify a pixel value based on the adjustment result pixel value H, the adjustment result pixel value M, and the adjustment result pixel value L. Specifically, the pixel value modification processing 1001 is processing of modifying the adjustment result pixel value L from the adjustment result pixel value M and the adjustment result pixel value L. The pixel value modification processing 1002 is processing of modifying the adjustment result pixel value M from the adjustment result pixel value H and the adjustment result pixel value M. The pixel value modification processing 1003 is processing of modifying the adjustment result pixel value L from the adjustment result pixel value H and the adjustment result pixel value L modified by the pixel value modification processing 1001. These pixel value modification processing blocks 1001 to 1003 correspond to steps S802 and S803 in FIG. 8.

In FIG. 10, the case where three types of low frequency component extraction processing blocks 911 to 913 are used has been described as an example. However, the low frequency component extraction processing is not limited to three types. When the low frequency component extraction processing is two types or more, any number can be adopted.

Further, in FIG. 10, the case where the pixel value modification processing is applied to all combinations of the adjustment result pixel value H, the adjustment result pixel value M, and the adjustment result pixel value L has been described as an example. However, at least one pixel value modification processing may be executed.

Furthermore, in FIG. 10, the case where two types of pixel values of the result of color adjustment are input to determine whether to modify the pixel value of the result of color adjustment in the pixel value modification processing blocks 1001 to 1003 has been described as an example. However, three types or more of the pixel value of the result of color adjustment can also be input to determine whether to modify the pixel value of the result of color adjustment in the pixel value modification processing blocks 1001 to 1003. For example, when the adjustment result pixel value H, the adjustment result pixel value M, and the adjustment result pixel value L are input and "adjustment result pixel value H adjustment result pixel value M adjustment result pixel value L" holds, the adjustment result pixel value L and the adjustment result pixel value M, or either thereof can be modified.

In the present exemplary embodiment, the case where the original image is brightly corrected, in other words, the case where $\gamma_1$ is smaller than 1.0 in equations (4) to (6), has been described as an example. However, also when $\gamma_1$ is made larger than 1.0 and the original image is darkly corrected, equations (4) to (6) can be applied if a sign of inequality is properly reversed.

Still furthermore, in the present exemplary embodiment, the case where the adjustment ratio by the luminance low frequency component (low) or only the result of color adjustment is modified has been described as an example. However, when it is in the range that the contribution of the result of color adjustment by the luminance low frequency component (low) is generally reduced before modification, the adjustment ratio by the luminance low frequency component (high) or the result of color adjustment may also be modified.

As described above, in the present exemplary embodiment, when an image is brightly corrected using a plurality of luminance low frequency components different in frequency band, based on the result of color adjustment by luminance low frequency components, the following determination is executed. In other words, it is determined whether an effect of color adjustment by a relatively low low-frequency component is larger than an effect of color adjustment by a relatively high low frequency component. Then, when the effect of color adjustment by the relatively low low-frequency component is larger than the effect of color adjustment by the relatively high low frequency component, the contribution of the effect of color adjustment by the relatively low low-frequency component is reduced. Accordingly, it can be realized that overcorrection on the bright section side within the boundary between the bright section and the dark section is reduced and the excellent result of color adjustment of the image is obtained without executing edge extraction. Thus, the excellent image correction result can be obtained. Accordingly, in a scene such as backlight, which is difficult to correctly determine brightness of an image, it can be realized more easily and securely that a properly bright digital image is obtained than in a conventional image processing apparatus.

Next, a second exemplary embodiment of the present invention will be described. In the above-described first exemplary embodiment, the case where the number of luminance low frequency components to be used in color adjustment is set to two has been described as an example. Contrary to this, in the present exemplary embodiment, the number of luminance low frequency components to be used in color adjustment is set to three or more will be described as an example. Thus, the present exemplary embodiment is mainly different in configurations and processing based on the difference in the number of luminance low frequency components to be used in color adjustment from the first exemplary embodiment. Accordingly, in description of the present exemplary embodiment, the same component as that in the first exemplary embodiment is provided with the same reference numeral as that provided in FIGS. 1 to 10 and its detail description will be omitted.

When three or more types of the luminance low frequency component are present, a plurality of combinations of a luminance low frequency component containing a relatively high frequency component and a luminance low frequency component containing a relatively low frequency component exists among these. It may be configured so as to independently execute modification processing in steps S504 to S505 illustrated in FIG. 5 or in steps S801 to S803 illustrated in FIG. 8 in the present exemplary embodiment for this plurality of combinations respectively.

Further, it is not necessary to need to execute processing for all of the plurality of combinations. Thus, some combinations among these may be determined in advance to execute processing only thereto.

Furthermore, true/false determination in step S504 illustrated in FIG. 5 and in step S802 illustrated in FIG. 8 in the first exemplary embodiment is executed for each of the plurality of combinations concerning the luminance low frequency component. Then, it may also be configured so as to divide the processing by a logical sum or a logical product of this true/false determination.

Thus, even if the luminance low frequency component to be used in color adjustment is set to three types or more, an effect similar to that in the first exemplary embodiment can be obtained. Still furthermore, also in the present exemplary embodiment, various modifications described in the first exemplary embodiment can be applied.

Next, a third exemplary embodiment of the present invention will be described. The above-described halo phenomenon becomes apparent in the vicinity of a particularly bright pixel value. Thus, in the present exemplary embodiment, when a luminance value of the pixel for correction is high, modification processing of the ratio of color adjustment and the result of color adjustment described in the first and the second exemplary embodiments is executed. When a luminance value of the pixel for correction is not high, the modification processing is not executed. Thus, in the present exemplary embodiment, determination whether to execute modification processing of the ratio of color adjustment and the result of color adjustment is added to the first and the second exemplary embodiments. Accordingly, in description of the present exemplary embodiment, the same component as that in the first and the second exemplary embodiments is provided with the same reference numeral as that provided in FIGS. 1 to 10 and the detail description will be omitted.

Determination whether luminance of the pixel for correction is high can be realized by comparing a threshold value and a luminance value obtained in step S502 in pixels. This will specifically be described. For example, in the configuration of the first and the second exemplary embodiments, determination whether the luminance value of the pixel for correction is higher than the threshold value is further added to the determination processing in step S504 illustrated in FIG. 5 or in step S802 illustrated in FIG. 8. Then, it is configured so as to calculate a logical product between this result of determination and the result of determination in step S504 or S804 previously described in the first and the second exemplary embodiments to subject the result of its logical product to the result of determination in step S504 or S804. The threshold value to the luminance value to be used in the present exemplary embodiment may be determined in advance. For example, prior to this processing, it can be configured so as to allow a user to input a threshold value.

Further, the present exemplary embodiment determines the luminance value of the pixel for correction. However, it is not necessary to execute processing like this. For example, the luminance low frequency component signal value containing a relatively high frequency component among a plurality of luminance low frequency components different in frequency band can also be used instead of the luminance value of the pixel for correction.

As described above, in the present exemplary embodiment, only when the halo phenomenon is likely to become apparent, modification processing as described in the first and the second exemplary embodiments is executed. Accordingly, in addition to the effect described in the first and the second exemplary embodiments, in a pixel in which a pixel before correction is relatively dark and the halo phenomenon does not become apparent, an effect is obtained which allows the modification processing to be omitted and the load of correction processing execution to be reduced.

Next, a fourth exemplary embodiment of the present invention will be described. The halo phenomenon becomes apparent when it is strongly corrected particularly in a bright direction. Accordingly, in the present exemplary embodiment, when $\gamma_1$ which is a parameter for controlling the strength of processing is small, modification processing of the ratio of color adjustment and the result of color adjustment described in the first to the third exemplary embodiments is executed. When $\gamma_1$ is not small, the modification processing is not executed. Thus, in the present exemplary embodiment, determination whether the modification processing of the ratio of color adjustment and the result of color adjustment is executed is added to the first and the second exemplary embodiments. Further, in the present exemplary embodiment, determination whether the modification processing of the ratio of color adjustment and the result of color adjustment is executed based on the parameter $\gamma_1$ is mainly added to the third exemplary embodiment. Accordingly, in description of the present exemplary embodiment, the same component as that in the first to the third exemplary embodiments is provided with the same reference numeral as that provided in FIGS. 1 to 10 and the detail description will be omitted.

Determination whether the parameter $\gamma_1$ is small can be realized by comparing the threshold value and the parameter $\gamma_1$. This will specifically be described. For example, in the configuration of the first to the third exemplary embodiments, determination whether the value of the parameter $\gamma_1$ is smaller than the threshold value is further added to the determination processing in step S504 illustrated in FIG. 5 or in step S802 illustrated in FIG. 8. Then, it is configured so as to calculate a logical product between this result of determination and the result of determination processing in step S504 or S804 previously described in the first to the third exemplary embodiments to subject the result of its logical product to the result of determination in step S504 or S804. The threshold value to the parameter $\gamma_1$ to be used in the present exemplary embodiment may be determined in advance. For example, prior to this processing it can be configured so as to allow a user to input a threshold value.

With the configuration described above, determination of processing is executed for each pixel. However, it is not necessary to execute processing like this. For example, in the first to the third exemplary embodiments, first image processing with a halo reduced function and second image processing without the halo reduced function are prepared. Then, processing can be divided to either of the first image processing and the second image processing by the result of determination of the parameter $\gamma_1$ and the threshold value.

As described above, in the present exemplary embodiment, only when the halo phenomenon is likely to become apparent, the modification processing as described in the first to the third exemplary embodiments is executed. Accordingly, in addition to the effect described in the first to the third exemplary embodiments, an effect is obtained which allows the modification processing to be omitted when the strength of correction processing is relatively small and the load of correction processing execution to be reduced.

Next, a fifth exemplary embodiment of the present invention will be described. In the above-described first to fourth exemplary embodiments, whether to modify the result of color adjustment is determined using the ratio of color adjustment by each low frequency component and the pixel value of the result of color adjustment. When after the luminance low frequency component has been modified, this determination is executed will be described as an example. Thus, in the present exemplary embodiment, processing of modifying the luminance low frequency component is mainly added to the first to the fourth exemplary embodiments. Accordingly, in description of the present exemplary embodiment, the same component as that in the first to the fourth exemplary embodiments is provided with the same reference numeral as that provided in FIGS. 1 to 10 and the detail description will be omitted.

Figure 11:
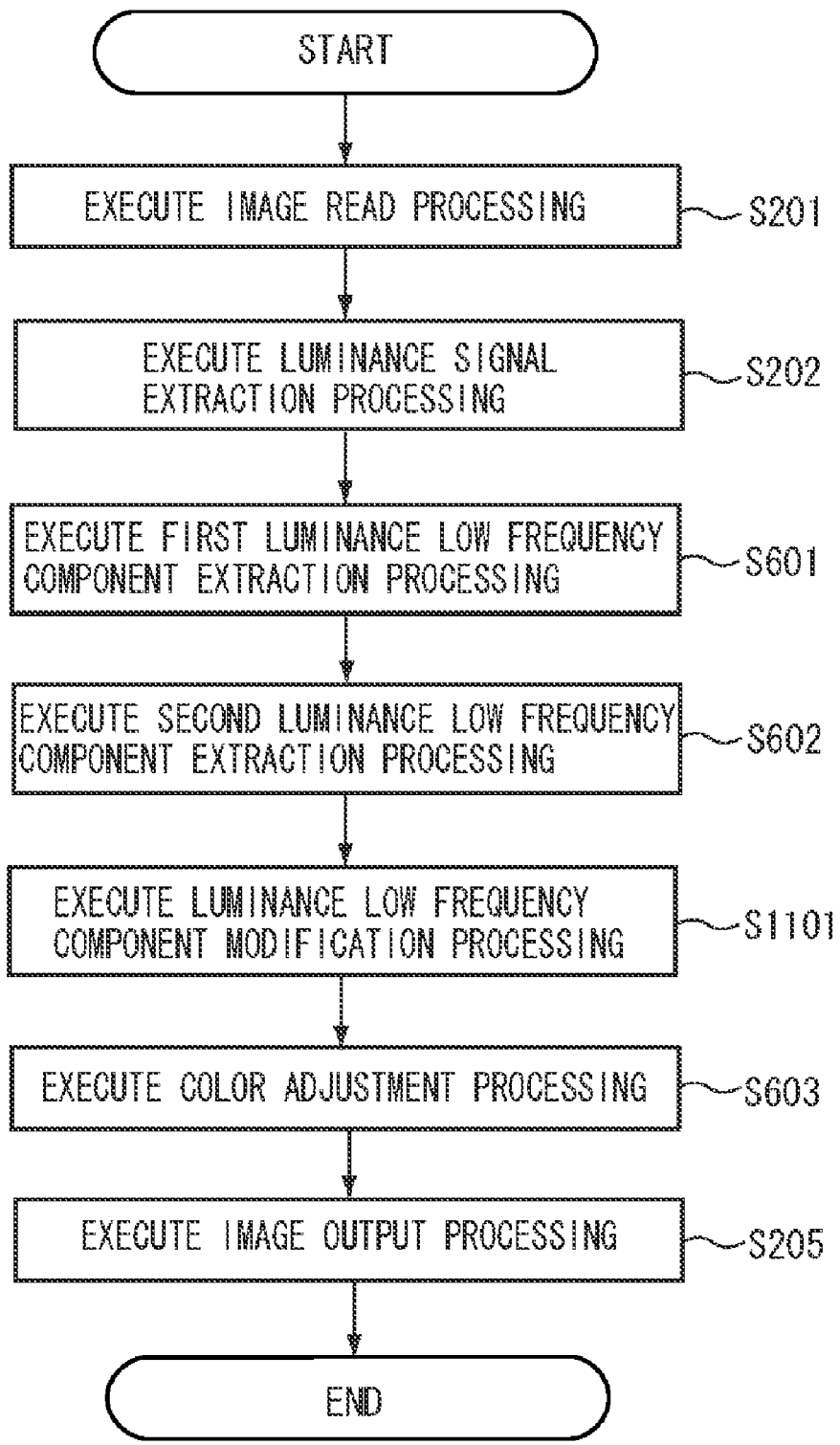
FIG. 11 is a flowchart illustrating an example of image processing in an image processing apparatus when a plurality of low frequency luminance components different in frequency band is used.

FIG. 11 is a flowchart illustrating an example of image processing in the image processing apparatus when a plurality of low frequency luminance components different in frequency band is used. In FIG. 11, the same processing as that in FIG. 6 is provided with the same reference numeral as that in FIG. 6 and its detail description will be omitted.

FIG. 11 is different from FIG. 6 in that the luminance low frequency component modification processing is executed subsequent to step S602.

It has been described that according to FIG. 3, the halo phenomenon occurs until the portion away from the bright and dark area, and in the conspicuous area, expression (18) or expression (19) holds.

"gain value by luminance low frequency component (high)302"<"gain value by luminance low frequency component(low)303"　　　(18)

"correction result signal(high)304"<"correction result signal(low)305"　　　(19)

However, on the other hand, expression (19') also holds.

"luminance low frequency component(high)302">"luminance low frequency component(low)303"　　　(19')

Accordingly, in the present exemplary embodiment, when a luminance low frequency component pixel value having relatively high frequency characteristics is larger than a luminance low frequency component pixel value having frequency characteristics lower than that, the contribution of the luminance low frequency component pixel value having its low frequency characteristics to correction is made small. Thus, the halo phenomenon can be reduced. Therefore, in the present exemplary embodiment, for example, whether the following expression (20) holds may be determined.

$$f_h > f_l \quad (20)$$

where $f_h$ is a luminance low frequency component (high) and $f_l$ is a luminance low frequency component (low). This sign of inequality may also be included with an equal sign.

Further, a threshold value is provided and instead of the previous condition determination, whether the following expression (21) is satisfied may also be determined.

$$f_h - f_l > thrC \qquad (21)$$

Furthermore, instead of this, whether the following expression (22) is satisfied may also be determined.

$$f_h \div f_l < thrD \qquad (22)$$

where thrC and thrD are threshold values and may be determined in advance.

For example, prior to this processing, the threshold value can be input by a user.

Modification of the luminance low frequency component can simply be performed by the following equation (23):

$$f_l' = f_h \qquad (23)$$

where $f_l'$ is a luminance low frequency component (low) after modification.

However, it is useful to modify $f_l$ so as to bring $f_l$ close to $f_h$ such that a value is gently changed in a portion where true/false result of this determination is switched. Thus, in the present exemplary embodiment, modification of the luminance low frequency component can be performed by the following equation (24):

$$f_l' = \alpha f_h + (1.0 - \alpha) f_l \qquad (24)$$

where $\alpha$ is a predetermined coefficient ($0 < \alpha \leq 1.0$).

For example, a configuration is made simple when modification of the luminance low frequency component is performed as $\alpha = 0.5$ and then, "$f_l' = (f_h + f_l) \div 2$".

Figure 12:
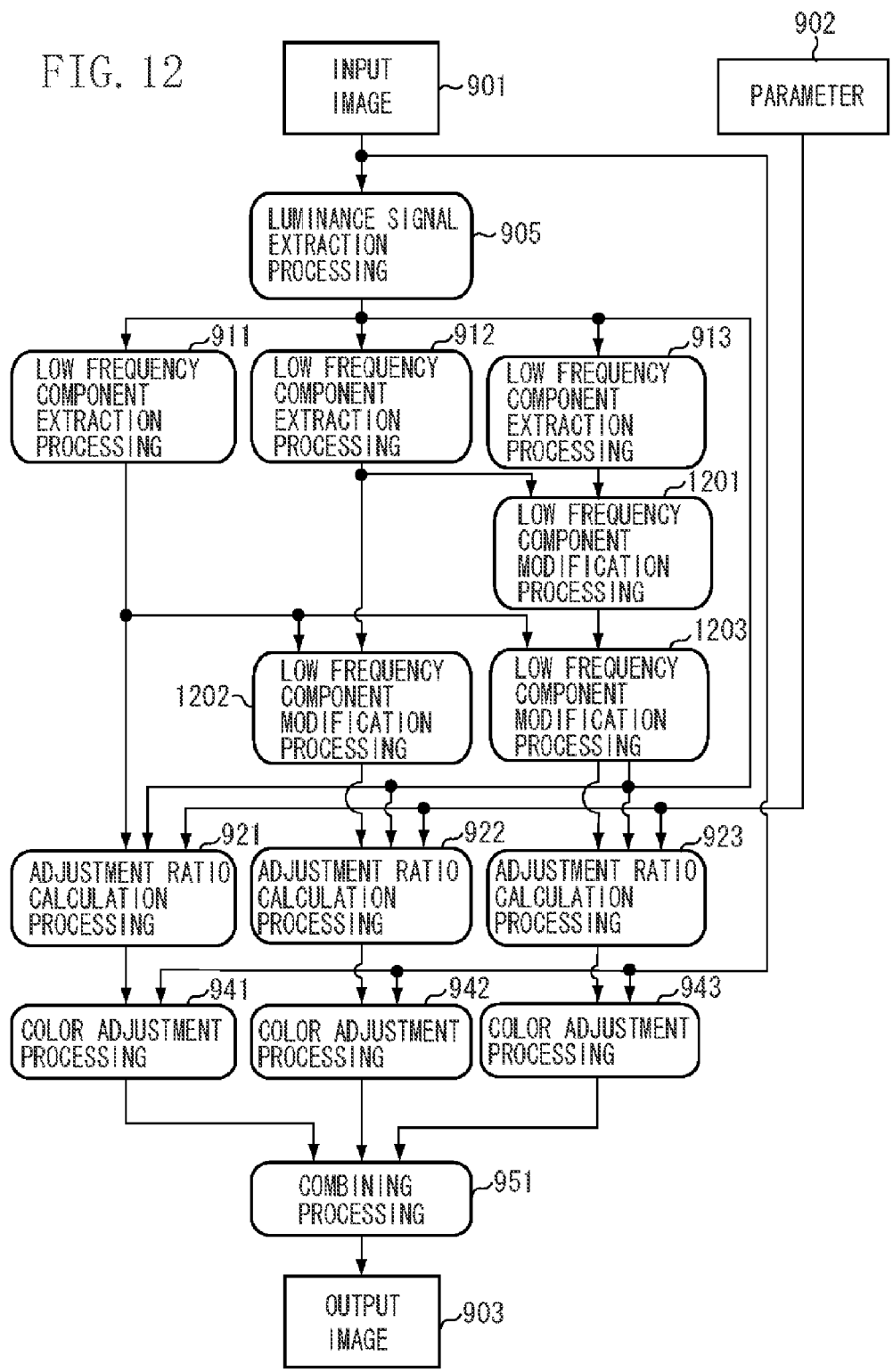
FIG. 12 is a block diagram illustrating an example of image processing in an image processing apparatus.

FIG. 12 is a block diagram illustrating an example of image processing in the image processing apparatus described above. In FIG. 12, processing similar to that in FIG. 9 is provided with the same reference numeral as that in FIG. 9 and its detail description will be omitted. In FIG. 12, the luminance low frequency component is modified by low frequency component modification processing blocks 1201 to 1203. In the present exemplary embodiment, for description, the luminance low frequency component pixel values generated by the low frequency component extraction processing blocks 911 to 913 are referred to as a luminance low frequency component H, a luminance low frequency component M, and a luminance low frequency component L, respectively.

The low frequency component modification processing blocks 1201 to 1203 in FIG. 12 are processing of modifying the luminance low frequency component pixel value based on the luminance low frequency component H, the luminance low frequency component M, and the luminance low frequency component L. Specifically, the low frequency component modification processing 1201 is processing of modifying the luminance low frequency component L based on the luminance low frequency component M and the luminance low frequency component L. The low frequency component modification processing 1202 is processing of modifying the luminance low frequency component M based on the luminance low frequency component H and the luminance low frequency component M. The low frequency component modification processing 1203 is processing of modifying the luminance low frequency component L based on the luminance low frequency component H and the luminance low frequency component L modified by the low frequency component modification processing 1201. These low frequency component modification processing 1201 to 1203 blocks correspond to the processing in step S1101 illustrated in FIG. 11.

In FIG. 12, the case where three types of low frequency component extraction processing 911 to 913 are used has been described as an example. However, the low frequency component extraction processing is not limited to three types. When the low frequency component extraction processing is two types or more, any number can be adopted.

Further, in FIG. 12, the case where the low frequency component modification processing is applied to all combinations of the luminance low frequency component H, the luminance low frequency component M, and the luminance low frequency component L has been described as an example. However, at least one low frequency component modification processing may be executed.

Furthermore, in FIG. 12, the case where two types of luminance low frequency component are input to determine whether to modify the luminance low frequency component in the low frequency component modification processing blocks 1201 to 1203 has been described as an example. However, three types or more of luminance low frequency component can also be input to determine whether to modify the luminance low frequency component in the low frequency component modification processing based on 1201 to 1203. For example, when the luminance low frequency component H, the luminance low frequency component M, and the luminance low frequency component L are input and "luminance low frequency component H≧luminance low frequency component M≧luminance low frequency component L" holds, the luminance low frequency component L and the luminance low frequency component M or either thereof can be modified.

As described above, in the present exemplary embodiment, when a luminance low frequency component pixel value having relatively high frequency characteristics is larger than a luminance low frequency component pixel value having frequency characteristics lower than that, the contribution of the luminance low frequency component pixel value having its low frequency characteristics to correction is made small. Thus, the halo phenomenon can be reduced.

Next, a sixth exemplary embodiment of the present invention will be described. In the above-described first to fifth exemplary embodiments, the case where the result of color adjustment individually generated based on a plurality of luminance low frequency components is finally combined has been described as an example. Contrary to this, in the present exemplary embodiment, when a plurality of luminance low frequency component images is combined before color adjustment will be described as an example. Thus, the present exemplary embodiment is mainly different in processing when the plurality of luminance low frequency component images is combined from the first to the fifth exemplary embodiments. Accordingly, in description of the present exemplary embodiment, the same component as that in the first to the fifth exemplary embodiments is provided with the same reference numeral as that provided in FIGS. 1 to 12 and the detail description will be omitted. In the present exemplary embodiment, an effect similar to that in the first to the fifth exemplary embodiments is obtained. However, the result of processing is different.

Figure 13:
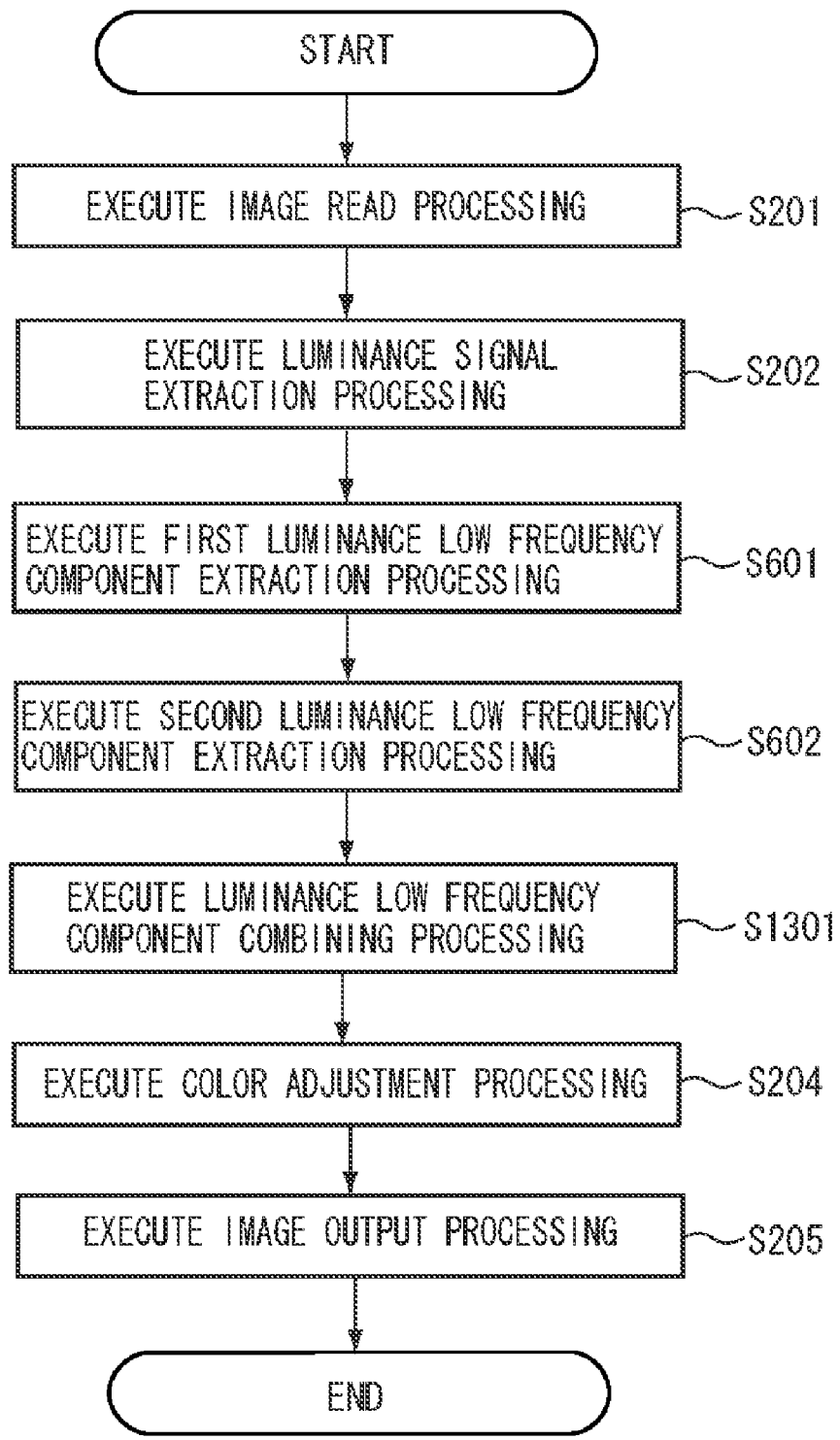
FIG. 13 is a flowchart illustrating an example of image processing in an image processing apparatus when a plurality of low frequency luminance components different in frequency band is used.

FIG. 13 is a flowchart illustrating an example of image processing in the image processing apparatus when a plurality of low frequency luminance components different in frequency band is used. In FIG. 13, the same processing as that in FIG. 6 is provided with the same reference numeral as that in FIG. 6 and its detail description will be omitted. In FIG. 13, the image processing apparatus combines the luminance low frequency component images in step S1301 subsequent to step S602. In the present exemplary embodiment, the weighted average is performed to luminance low frequency component images, thereby combining the luminance low frequency component images.

FIG. 14 is a block diagram illustrating an example of image processing in the image processing apparatus described above. In FIG. 14, the same processing as that in FIG. 9 is provided with the same reference numeral as that in FIG. 9 and its detail description will be omitted. In FIG. 14, combining ratio determination processing 1401 refers to each luminance low frequency component pixel generated by the low frequency component extraction processing blocks 911 to 913 to determine a combining ratio for each pixel. In the present exemplary embodiment, combining is performed by the weighted average. Thus, the combining ratio determination processing 1401 determines a weighting coefficient of the weighted average.

In the present exemplary embodiment, the combining ratio determination processing 1401 sets the same value to weighting to each low frequency component, for example, as an initial value. If a condition of the following expression (25) holds in FIG. 3, the combining ratio determination processing 1401 adjusts weighting to reduce (lighten) weighting to the luminance low frequency component (low).

"luminance low frequency component(high)302">"luminance low frequency component(low)303"  (25)

Low frequency component combining processing 1402 performs the weighted average of luminance low frequency component pixels generated by the low frequency component extraction processing blocks 911 to 913 according to weighted combining determined by the combining ratio determination processing 1401 to combine those.

As described above, in the present exemplary embodiment, the luminance low frequency component pixels are combined before color adjustment. Thus, the adjustment ratio calculation processing and the color adjustment processing may be performed one time each. Accordingly, in addition to the effect described in the first to the fifth exemplary embodiments, an effect is obtained which allows a throughput to be further reduced. When the processing in the present exemplary embodiment is realized by a circuit, there is an effect of allowing the size of the circuit to be made small.

Each unit which configures the image processing apparatus in the above-described exemplary embodiments of the present invention and each step of the image processing method can be realized by operating a program stored on a RAM or a ROM in a computer. A computer-readable storage medium storing the program and the above-described program are included in the present invention.

Further, the present invention also allows an exemplary embodiment as, for example, a system, an apparatus, a method, a program, a storage medium, or the like. Specifically, the present invention may also be applied to a system which includes a plurality of devices. Furthermore, the present invention may also be applied to an apparatus which includes one device.

The present invention includes that which supplies a software program (in exemplary embodiments, program corresponding to flowcharts illustrated in FIGS. 5 to 9, FIG. 11, and FIG. 13) for realizing a function in the above-described exemplary embodiment to a system or an apparatus directly or from a remote place. Then, the present invention also includes a case that is accomplished by causing a computer on its system or apparatus to read the supplied program code to execute it.

Accordingly, a program code itself also realizes the present invention, which is installed on the computer in order to realize processing of the function of the present invention. In other words, the present invention also includes a computer program itself for realizing processing of the function of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-093350 filed Apr. 7, 2009, which is hereby incorporated by reference herein in its entirety.

What is claimed is:

1. An image processing apparatus comprising:
an extraction unit configured to extract a plurality of luminance low frequency components different in frequency band from a luminance component of image data; and
a color adjustment unit configured to execute color adjustment of the image data using the image data or the luminance component of the image data and the plurality of luminance low frequency components,
wherein, when an effect of color adjustment based on the luminance low frequency component having a relatively low frequency is larger than an effect of color adjustment based on the luminance low frequency component having a relatively high frequency among the plurality of luminance low frequency components, the color adjustment unit reduces the effect of color adjustment based on the luminance low frequency component having the relatively low frequency.

2. An image processing apparatus comprising:
an extraction unit configured to extract a plurality of luminance low frequency components different in frequency band from a luminance component of image data; and
a color adjustment unit configured to execute color adjustment of the image data using the luminance component and the plurality of luminance low frequency components,
wherein, when a first ratio of a result of adjustment of a luminance component using the luminance low frequency component having the relatively low frequency among the plurality of luminance low frequency components to the luminance component is larger than a second ratio of a result of adjustment of a luminance component using the luminance low frequency component having the relatively high frequency among the plurality of luminance low frequency components to the luminance component, the color adjustment unit modifies the first ratio to a third ratio so as to reduce an effect of color adjustment based on the first ratio, and executes the color adjustment based on the second ratio and the third ratio.

3. The image processing apparatus according to claim 2, wherein the color adjustment unit reduces the effect of color adjustment based on the first ratio by bringing the first ratio to the second ratio.

4. The image processing apparatus according to claim 1, wherein the color adjustment unit reduces the effect of color adjustment based on the luminance low frequency component having the relatively low frequency when a pixel value obtained after color adjustment has been executed based on the luminance low frequency component having the relatively low frequency is larger than a pixel value obtained after color adjustment has been executed based on the luminance low frequency component having the relatively high frequency.

5. The image processing apparatus according to claim 4, wherein the color adjustment unit reduces the effect of color adjustment based on the luminance low frequency component having the relatively low frequency by bringing the pixel value obtained after color adjustment has been executed based on the luminance low frequency component having the relatively low frequency close to the pixel value obtained after color adjustment has been executed based on the luminance low frequency component having the relatively high frequency.

6. The image processing apparatus according to claim 1, wherein the plurality of luminance low frequency components includes three or more luminance low frequency components, and
wherein the color adjustment unit determines whether the effect of color adjustment based on the luminance low frequency component having the relatively low frequency is larger than the effect of color adjustment based on the luminance low frequency component having the relatively high frequency with respect to each of a plurality of groups each including two luminance low frequency components among the three or more luminance low frequency components, and reduces the effect of color adjustment based on the luminance low frequency component having the relatively low frequency according to a value of a logical sum or a logical product of results of the determination.

7. The image processing apparatus according to claim 1, wherein the color adjustment unit executes weighted addition to combine a plurality of luminance low frequency component images obtained by executing color adjustment for at least one of the plurality of luminance low frequency components.

8. The image processing apparatus according to claim 7, wherein a weighting to a pixel value obtained after color adjustment has been executed based on the luminance low frequency component having the relatively low frequency is made lighter than a weighting to a pixel value obtained after color adjustment has been executed based on the luminance low frequency component having the relatively high frequency.

9. The image processing apparatus according to claim 1, further comprising a determination unit configured to determine whether to execute processing by the color adjustment unit on a pixel-by-pixel basis according to a pixel value of the image data or a pixel value of the luminance low frequency component having the relatively high frequency,
wherein the color adjustment unit executes color adjustment of the image data when the determination unit determines to execute processing by the color adjustment unit.

10. The image processing apparatus according to claim 1, further comprising a determination unit configured to determine whether to execute processing by the color adjustment unit on a pixel-by-pixel basis,
wherein the color adjustment unit executes color adjustment of the image data using a parameter for adjusting an extent of the color adjustment, the image data or the luminance component of the image data, and the plurality of luminance low frequency components,
wherein the determination unit determines to execute processing by the color adjustment unit when the parameter makes the extent of the color adjustment larger than a threshold value, and
wherein the color adjustment unit executes color adjustment of the image data when the determination unit determines to execute processing by the color adjustment unit.

11. An image processing method comprising:
extracting a plurality of luminance low frequency components different in frequency band from a luminance component of image data;
executing color adjustment of the image data using the image data or the luminance component of the image data and the plurality of luminance low frequency components; and
when an effect of color adjustment based on the luminance low frequency component having a relatively low frequency is larger than an effect of color adjustment based on the luminance low frequency component having a relatively high frequency among the plurality of luminance low frequency components, reducing the effect of color adjustment based on the luminance low frequency component having the relatively low frequency.

12. A computer-readable storage medium storing a program for causing a computer to perform the image processing method according to claim 11.

13. The image processing apparatus according to claim 2, wherein the plurality of luminance low frequency components includes three or more luminance low frequency components, and
wherein the color adjustment unit determines whether the effect of color adjustment based on the first ratio is larger than the effect of color adjustment based on the second ratio with respect to each of a plurality of groups each including two luminance low frequency components among the three or more luminance low frequency components, and reduces the effect of color adjustment based on the first ratio according to a value of a logical sum or a logical product of results of the determination.

14. The image processing apparatus according to claim 2, wherein the color adjustment unit executes weighted addition to combine a plurality of luminance low frequency component images obtained by executing color adjustment based on at least one of the plurality of luminance low frequency components.

15. The image processing apparatus according to claim 14, wherein a weighting to a pixel value obtained after color adjustment has been executed based on the first ratio is made lighter than a weighting to a pixel value obtained after color adjustment has been executed based on the second ratio.

16. The image processing apparatus according to claim 2, further comprising a determination unit configured to determine whether to execute processing by the color adjustment unit on a pixel-by-pixel basis according to a pixel value of the luminance low frequency component having the relatively high frequency among the plurality of luminance low frequency components,
wherein the color adjustment unit executes color adjustment of the image data when the determination unit determines to execute processing by the color adjustment unit.

17. The image processing apparatus according to claim 2, further comprising a determination unit configured to determine whether to execute processing by the color adjustment unit on a pixel-by-pixel basis,
wherein the color adjustment unit executes color adjustment of the image data using a parameter for adjusting an extent of the color adjustment, the image data or the luminance component of the image data, and the plurality of luminance low frequency components, wherein the determination unit determines to execute processing by the color adjustment unit when the parameter makes the extent of the color adjustment larger than a threshold value, and wherein the color adjustment unit executes color adjustment of the image data when the determination unit determines to execute processing by the color adjustment unit.

18. The image processing apparatus according to claim 2, wherein the luminance component of the image data is an average of plural pieces of component data included in the image data, or a maximum value of the plural pieces of component data included in the image data, or one of the plural pieces of component data included in the image data.

19. An image processing method comprising:

extracting a plurality of luminance low frequency components different in frequency band from a luminance component of image data; and executing color adjustment of the image data using the luminance component and the plurality of luminance low frequency components, wherein, when a first ratio of a result of adjustment of a luminance component using the luminance low frequency component having the relatively low frequency among the plurality of luminance low frequency components to the luminance component is larger than a second ratio of a result of adjustment of a luminance component using the luminance low frequency component having the relatively high frequency among the plurality of luminance low frequency components to the luminance component, the first ratio is modified to a third ratio so as to reduces an effect of color adjustment based on the first ratio, and color adjustment is executed based on the second ratio and the third ratio.

20. A computer-readable storage medium storing a program for causing a computer to perform the image processing method according to claim 19.

* * * * *